United States Patent
Guo et al.

(10) Patent No.: US 11,096,066 B2
(45) Date of Patent: Aug. 17, 2021

(54) METHOD AND APPARATUS FOR UPLINK BEAM MANAGEMENT IN NEXT GENERATION WIRELESS SYSTEMS

(71) Applicant: Samsung Electronics Co., Ltd., Suwon-si (KR)

(72) Inventors: Li Guo, Allen, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/728,779

(22) Filed: Dec. 27, 2019

(65) Prior Publication Data

US 2020/0137592 A1 Apr. 30, 2020

Related U.S. Application Data

(63) Continuation of application No. 15/867,346, filed on Jan. 10, 2018, now Pat. No. 10,560,851.

(60) Provisional application No. 62/446,072, filed on Jan. 13, 2017, provisional application No. 62/450,822, filed on Jan. 26, 2017, provisional application No. 62/468,178, filed on Mar. 7, 2017, provisional application No. 62/518,318, filed on Jun. 12, 2017, provisional application No. 62/535,526, filed on Jul. 21, 2017, provisional application No. 62/552,832, filed on Aug. 31, 2017, provisional application No. 62/560,981, filed on Sep. 20, 2017, provisional application No. 62/585,871, filed on Nov. 14, 2017.

(51) Int. Cl.
*H04W 4/00* (2018.01)
*H04W 16/28* (2009.01)
*H04B 7/02* (2018.01)
*H04W 72/04* (2009.01)

(52) U.S. Cl.
CPC .............. *H04W 16/28* (2013.01); *H04B 7/02* (2013.01); *H04W 72/0473* (2013.01); *H04W 72/0406* (2013.01)

(58) Field of Classification Search
None
See application file for complete search history.

(56) References Cited

U.S. PATENT DOCUMENTS

| | | | | |
|---|---|---|---|---|
| 2013/0195025 A1* | 8/2013 | Chatterjee | .............. | H04B 7/024 370/329 |
| 2014/0016576 A1* | 1/2014 | Noh | ...................... | H04L 5/0048 370/329 |
| 2014/0219234 A1* | 8/2014 | Kim | ...................... | H04B 7/024 370/329 |
| 2015/0124673 A1* | 5/2015 | Ouchi | ................. | H04W 52/362 370/311 |

\* cited by examiner

*Primary Examiner* — Phirin Sam

(57) ABSTRACT

A method of a user equipment (UE) for beam management in a wireless communication system is provided. The method comprises receiving, from a base station (BS), a downlink message comprising configuration information that includes a direction of Tx beam and a pattern of the beam sweeping of a set of transmit (Tx) beams for sounding reference signals (SRSs); determining information comprising the direction of the Tx beam and the pattern of the beam sweeping of the set of Tx beams; and transmitting, to the BS, an uplink message including a number of the SRSs for the beam management of the set of Tx beams in accordance with the configuration information.

20 Claims, 16 Drawing Sheets

METHOD AND APPARATUS FOR UPLINK BEAM MANAGEMENT IN NEXT GENERATION WIRELESS SYSTEMS

CROSS-REFERENCE TO RELATED APPLICATIONS AND CLAIM OF PRIORITY

The present application is a continuation of U.S. patent application Ser. No. 15/867,346, filed Jan. 10, 2018, which claims priority to U.S. Provisional Patent Application No. 62/446,072, filed Jan. 13, 2017; U.S. Provisional Patent Application No. 62/450,822, filed Jan. 26, 2017; U.S. Provisional Patent Application No. 62/468,178, filed Mar. 7, 2017; U.S. Provisional Patent Application No. 62/518,318, filed Jun. 12, 2017; U.S. Provisional Patent Application No. 62/535,526, filed Jul. 21, 2017; U.S. Provisional Patent Application No. 62/552,832, filed Aug. 31, 2017; U.S. Provisional Patent Application No. 62/560,981, filed Sep. 20, 2017; and U.S. Provisional Patent Application No. 62/585,871, filed Nov. 14, 2017. The content of the above-identified patent documents is incorporated herein by reference.

TECHNICAL FIELD

The present application relates generally to random access operation in wireless communication systems. More specifically, this disclosure relates to uplink beam management in next generation wireless communication systems.

BACKGROUND

5th generation (5G) mobile communications, initial commercialization of which is expected around 2020, is recently gathering increased momentum with all the worldwide technical activities on the various candidate technologies from industry and academia. The candidate enablers for the 5G mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on. The International Telecommunication Union (ITU) has categorized the usage scenarios for international mobile telecommunications (IMT) for 2020 and beyond into 3 main groups such as enhanced mobile broadband, massive machine type communications (MTC), and ultra-reliable and low latency communications. In addition, the ITC has specified target requirements such as peak data rates of 20 gigabit per second (Gb/s), user experienced data rates of 100 megabit per second (Mb/s), a spectrum efficiency improvement of 3×, support for up to 500 kilometer per hour (km/h) mobility, 1 millisecond (ms) latency, a connection density of 106 devices/km2, a network energy efficiency improvement of 100× and an area traffic capacity of 10 Mb/s/m2. While all the requirements need not be met simultaneously, the design of 5G networks may provide flexibility to support various applications meeting part of the above requirements on a use case basis.

SUMMARY

The present disclosure relates to a pre-5th-Generation (5G) or 5G communication system to be provided for supporting higher data rates beyond 4th-Generation (4G) communication system such as long term evolution (LTE). Embodiments of the present disclosure provide multiple services in advanced communication systems.

In one embodiment, a user equipment (UE) for beam management in a wireless communication system is provided. The UE comprises a transceiver configured to receive, from a base station (BS), a downlink message comprising configuration information that includes a direction of transmit (Tx) beam and a pattern of the beam sweeping of a set of Tx beams for sounding reference signals (SRSs). The UE further comprises at least one processor configured to determine information comprising the direction of the Tx beam and the pattern of the beam sweeping of the set of Tx beams. The UE further comprises the transceiver configured to transmit, to the BS, an uplink message including a number of the SRSs for the beam management with the set of Tx beams in accordance with the configuration information.

In another embodiment, a BS for beam management in a wireless communication system is provided. The BS comprises at least one processor configured to determine information comprising a direction of a Tx beam and a pattern of a beam sweeping of a set of Tx beams and a transceiver configured to transmit, to a UE, a downlink message comprising the configuration information that includes the direction of the Tx beam and the pattern of the beam sweeping of the set of Tx beams for SRSs, and receive, from the UE, an uplink message including a number of the SRSs for the beam management of the set of Tx beams in accordance with the configuration information.

In yet another embodiment, a method of user equipment (UE) for beam management in a wireless communication system is provided. The method comprises receiving, from a BS, a downlink message comprising configuration information that includes a direction of Tx beam and a pattern of the beam sweeping of a set of Tx beams for SRSs, determining information comprising the direction of the Tx beam and the pattern of the beam sweeping of the set of Tx beams, and transmitting, to the BS, an uplink message including a number of the SRSs for the beam management of the set of Tx beams in accordance with the configuration information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v13.0.0, "E-UTRA, Physical channels and modulation;" 3GPP TS 36.212 v13.0.0, "E-UTRA, Multiplexing and Channel coding;" 3GPP TS 36.213 v13.0.0, "E-UTRA, Physical Layer Procedures;" 3GPP TS 36.321 v13.0.0, "E-UTRA, Medium Access Control (MAC) protocol specification;" and 3GPP TS 36.331 v13.0.0, "E-UTRA, Radio Resource Control (RRC) Protocol Specification."

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancellation and the like.

In the 5G system, hybrid frequency shift keying and quadrature amplitude modulation (FQAM) and sliding window superposition coding (SWSC) as an adaptive modulation and coding (AMC) technique, and filter bank multi carrier (FBMC), non-orthogonal multiple access (NOMA), and sparse code multiple access (SCMA) as an advanced access technology have been developed.

Figure 1:
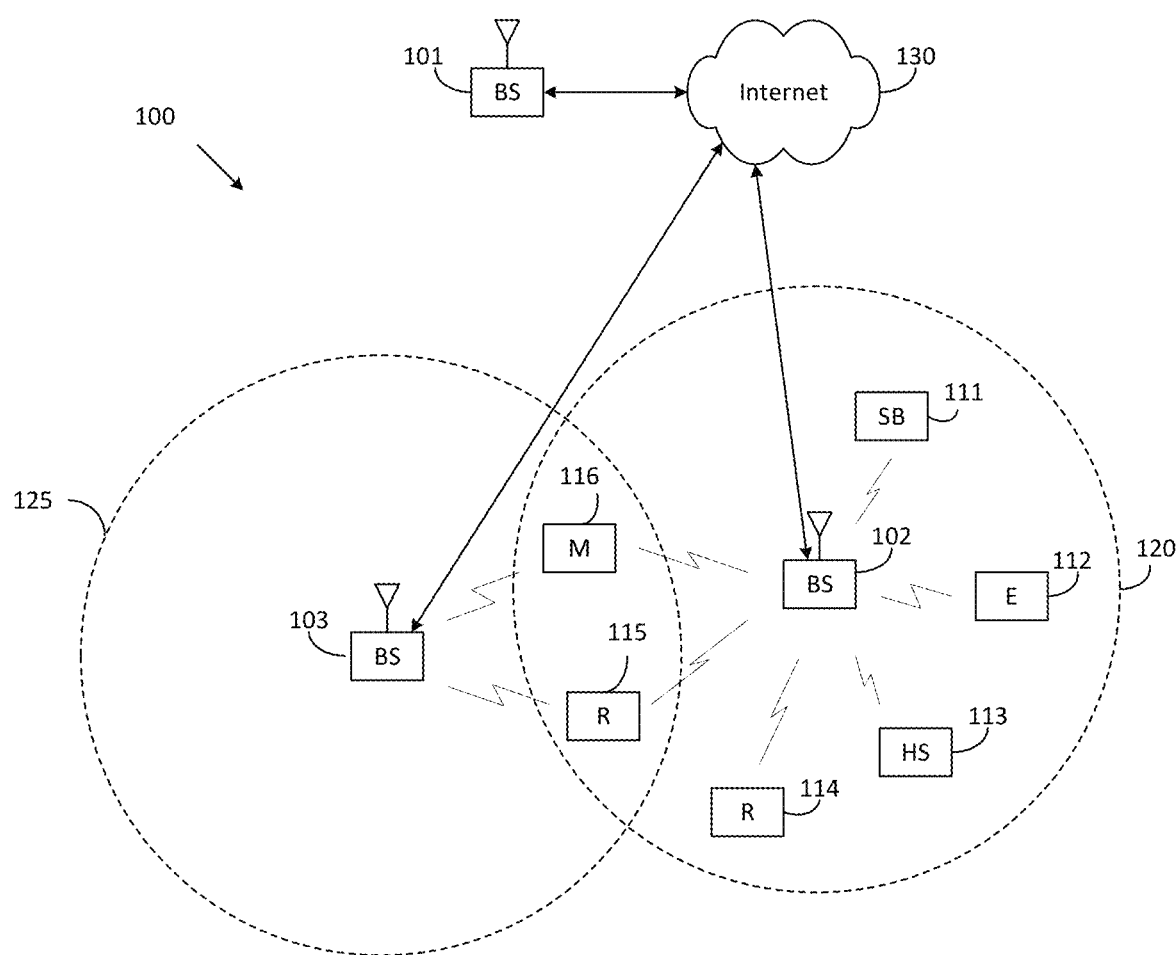
FIG. 1 illustrates an example wireless network according to embodiments of the present disclosure.
Figure 2:
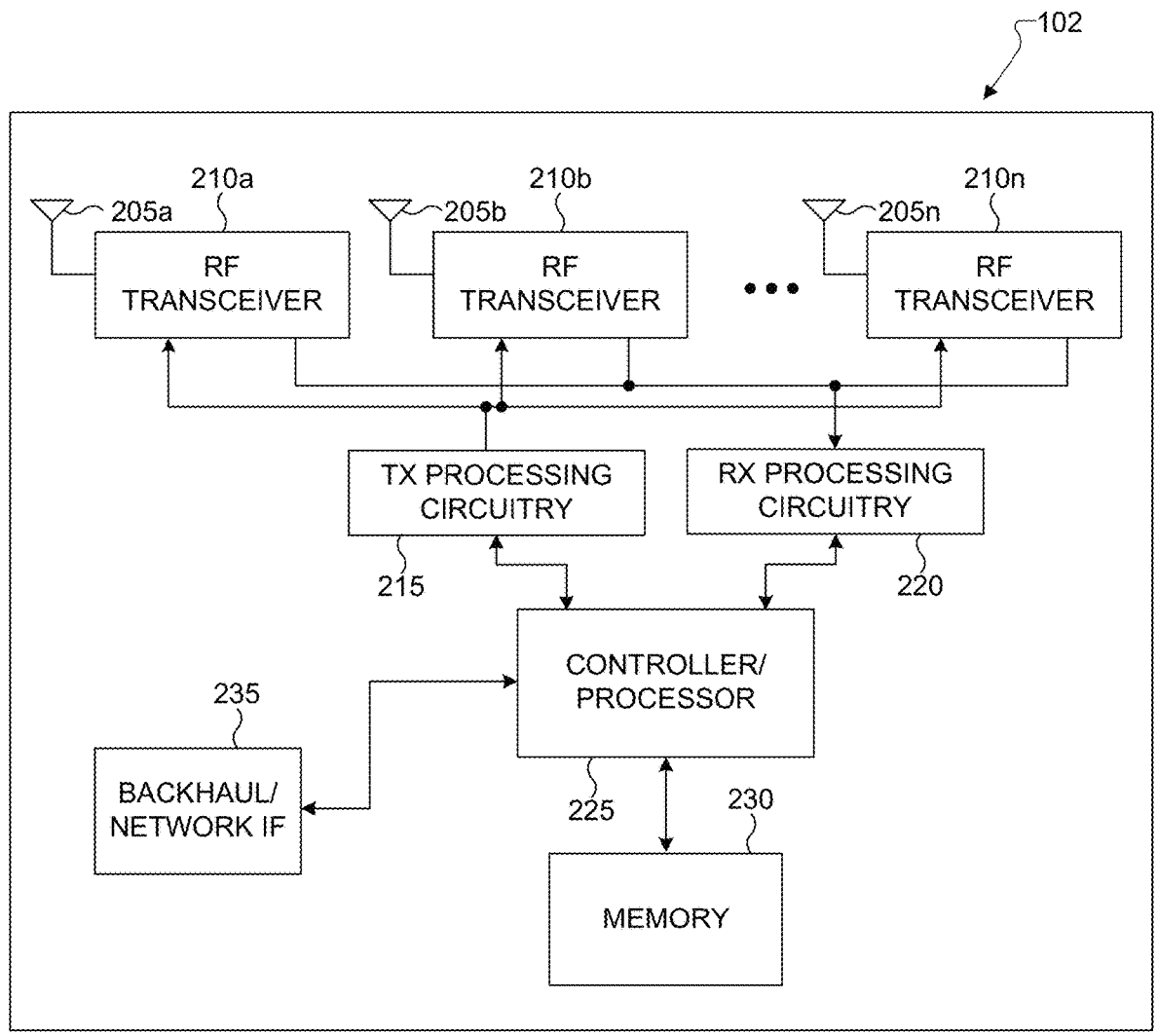
FIG. 2 illustrates an example eNB according to embodiments of the present disclosure.
Figure 3:
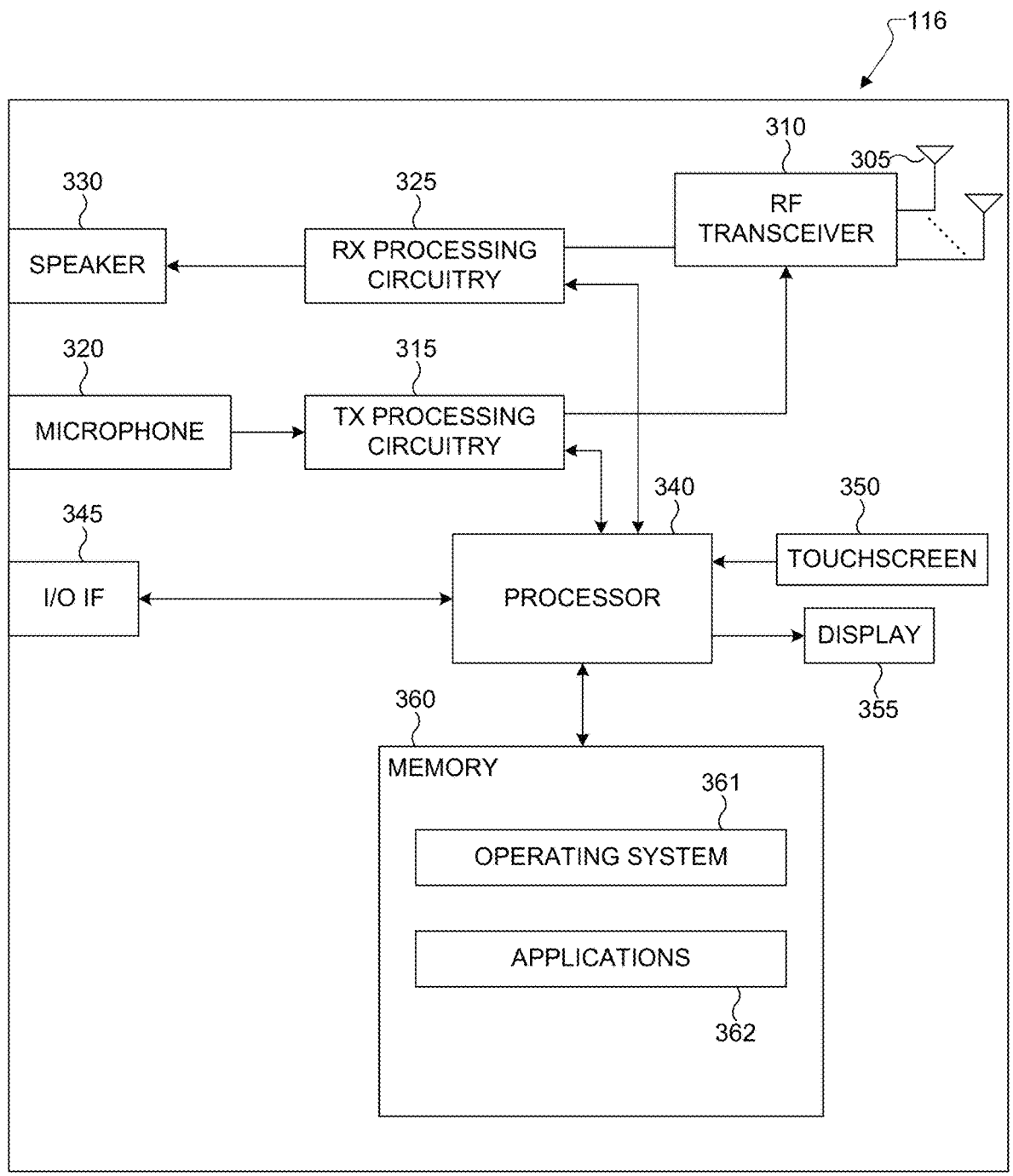
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programing, or a combination thereof, for efficient beam management an advanced wireless communication system. In certain embodiments, and one or more of the eNBs 101-103 includes circuitry, programing, or a combination thereof, for efficient beam management in an advanced wireless communication system.

Although FIG. 1 illustrates one example of a wireless network, various changes may be made to FIG. 1. For example, the wireless network could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205a-205n, multiple RF transceivers 210a-210n, transmit (TX) processing circuitry 215, and receive (RX) processing circuitry 220. The eNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the eNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the eNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
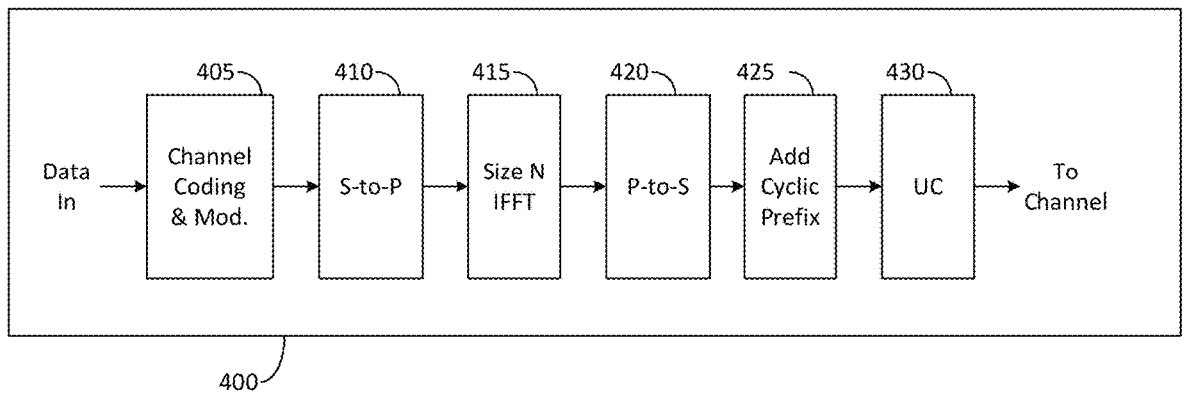
FIG. 4A illustrates an example high-level diagram of an orthogonal frequency division multiple access transmit path according to embodiments of the present disclosure.
Figure 4B:
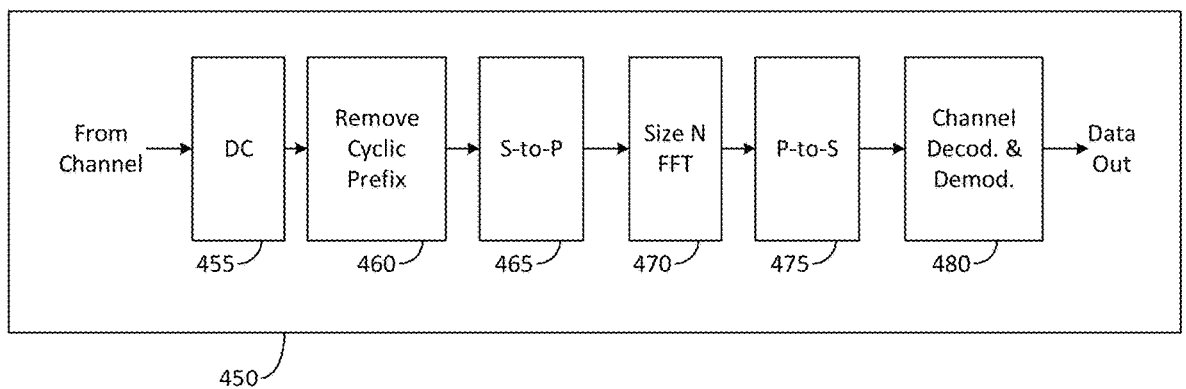
FIG. 4B illustrates an example high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (eNB) 102 or a relay station, and the receive path circuitry may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry may be implemented in a user equipment (e.g. user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNB s 101-103 and may implement a receive path corresponding to the architecture for receiving in the downlink from eNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption should be minimized as possible.

In LTE technologies, a time interval X which can contain one or more of the DL transmission part, guard, UL transmission part, and a combination of thereof regardless of they are indicated dynamically and/or semi-statically. Furthermore, in one example, the DL transmission part of time interval X contains downlink control information and/or downlink data transmissions and/or reference signals. In another example, the UL transmission part of time interval X contains uplink control information and/or uplink data transmissions and/or reference signals. In addition, the usage of DL and UL does not preclude other deployment scenarios e.g., sidelink, backhaul, relay). In some embodiments of the current disclosure, "a subframe" is another name to refer to "a time interval X," or vice versa. In order for the 5G network to support these diverse services are called network slicing.

In some embodiments, "a subframe" and "a time slot" can be used interchangeably. In some embodiments, "a subframe" refers to a transmit time interval (TTI), which may comprise an aggregation of "time slots" for UE"s data transmission/reception.

Figure 5:
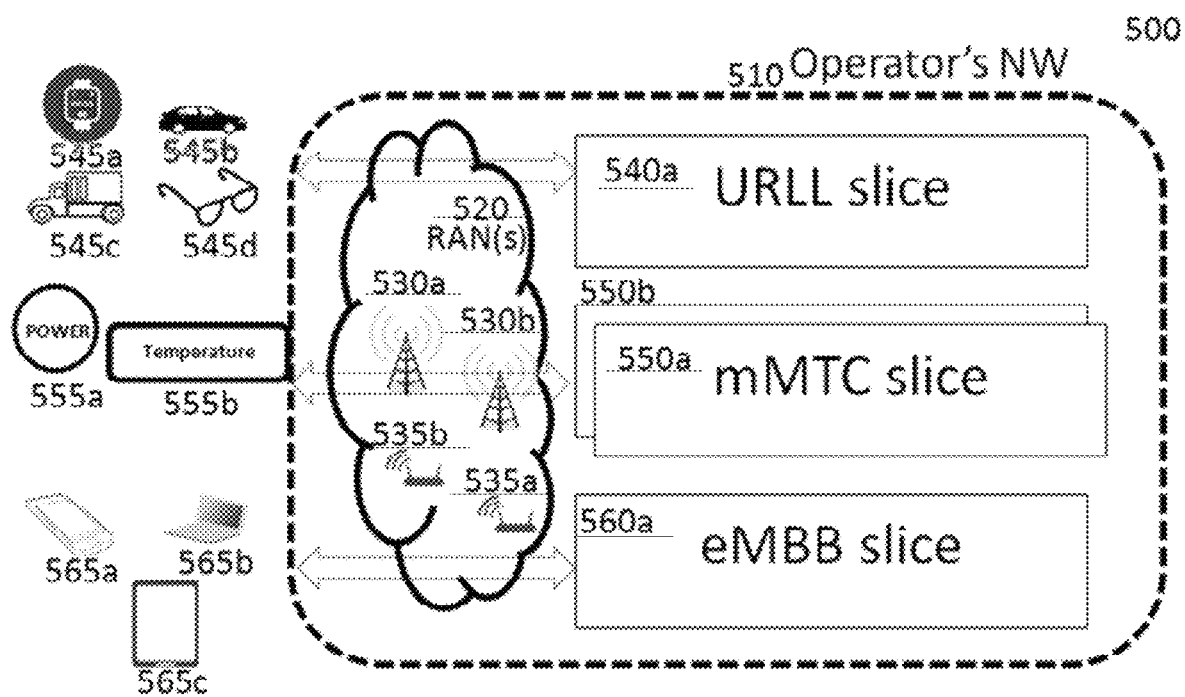
FIG. 5 illustrates an example network slicing according to embodiments of the present disclosure.

FIG. 5 illustrates a network slicing 500 according to embodiments of the present disclosure. An embodiment of the network slicing 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions. Other embodiments are used without departing from the scope of the present disclosure.

As shown in FIG. 5, the network slicing 500 comprises an operator's network 510, a plurality of RANS 520, a plurality of eNBs 530a, 530b, a plurality of small cell base stations 535a, 535b, a URLL slice 540a, a smart watch 545a, a car 545b, a, truck 545c, a smart glasses 545d, a power 555a, a temperature 555b, an mMTC slice 550a, an eMBB slice 560a, a smart phone (e.g., cell phones) 565a, a laptop 565b, and a tablet 565c (e.g., tablet PCs).

The operator's network 510 includes a number of radio access network(s) 520—RAN(s)—that are associated with network devices, e.g., eNBs 530a and 530b, small cell base stations (femto/pico eNBs or Wi-Fi access points) 535a and 535b, etc. The operator's network 510 can support various services relying on the slice concept. In one example, four slices, 540a, 550a, 550b and 560a, are supported by the network. The URLL slice 540a to serve UEs requiring URLL services, e.g., cars 545b, trucks 545c, smart watches 545a, smart glasses 545d, etc. Two mMTC slices 550a and 550b serve UEs requiring mMTC services such as power meters and temperature control (e.g., 555b), and one eMBB slice 560a requiring eMBB serves such as cells phones 565a, laptops 565b, tablets 565c.

In short, network slicing is a scheme to cope with various different qualities of services (QoS) in the network level. For supporting these various QoS efficiently, slice-specific PHY optimization may also be necessary. Devices 545a/b/c/d, 555a/b are 565a/b/c examples of user equipment (UE) of different types. The different types of user equipment (UE) shown in FIG. 5 are not necessarily associated with particular types of slices. For example, the cell phone 565a, the laptop 565b and the tablet 565c are associated with the eMBB slice 560a, but this is just for illustration and these devices can be associated with any types of slices.

In some embodiments, one device is configured with more than one slice. In one embodiment, the UE, (e.g., 565a/b/c) is associated with two slices, the URLL slice 540a and the eMBB slice 560a. This can be useful for supporting online gaming application, in which graphical information are transmitted through the eMBB slice 560a, and user interaction related information are exchanged through the URLL slice 540a.

In the current LTE standard, no slice-level PHY is available, and most of the PHY functions are utilized slice-agnostic. A UE is typically configured with a single set of PHY parameters (including transmit time interval (TTI) length, OFDM symbol length, subcarrier spacing, etc.), which is likely to prevent the network from (1) fast adapting to dynamically changing QoS; and (2) supporting various QoS simultaneously.

In some embodiments, corresponding PHY designs to cope with different QoS with network slicing concept are disclosed. It is noted that "slice" is a terminology introduced just for convenience to refer to a logical entity that is associated with common features, for example, numerology, an upper-layer (including medium access control/radio resource control (MAC/RRC)), and shared UL/DL time-frequency resources. Alternative names for "slice" include virtual cells, hyper cells, cells, etc.

Figure 6:
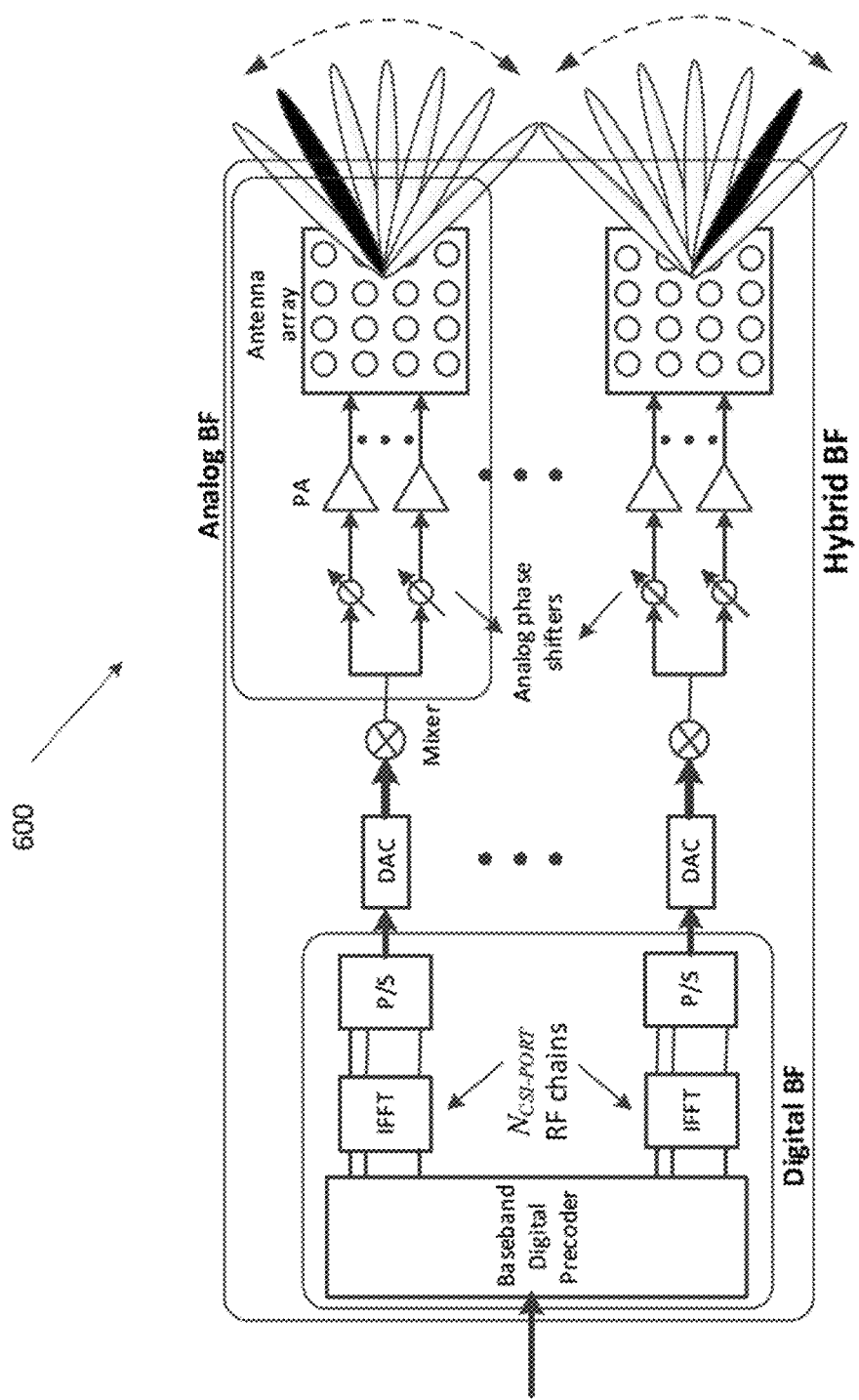
FIG. 6 illustrates an example number of digital chains according to embodiments of the present disclosure.

FIG. 6 illustrates an example number of digital chains 600 according to embodiments of the present disclosure. An embodiment of the number of digital chains 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

LTE specification supports up to 32 channel state information-reference signal (CSI-RS) antenna ports which enable an eNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6. In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks.

A gNB could utilize one or multiple transmit beams to cover the whole area of one cell. The gNB may form a transmit beam by applying suitable gains and phase settings to an antenna array. The transmit gain, i.e., the amplification of the power of the transmitted signal provided by a transmit beam, is typically inversely proportional to the width or area covered by the beam. At lower carrier frequencies, the more benign propagation losses may be feasible for gNB to provide coverage with a single transmit beam, i.e., ensure adequate received signal quality at the UE locations within the coverage area via the usage of a single transmit beam. In other words, at lower transmit signal carrier frequencies, the transmit power amplification provided by the transmit beam with a width large enough to cover the area may be sufficient to overcome the propagation losses to ensure adequate received signal quality at UE locations within the coverage area.

However, at higher signal carrier frequencies, the transmit beam power amplification corresponding to the same coverage area may not be sufficient to overcome the higher propagation losses, resulting in a degradation of received signal quality at UE locations within the coverage area. In order to overcome such a received signal quality degradation, the gNB may form a number of transmit beams, each providing coverage over a region narrower than the overall coverage region, but providing the transmit power amplification sufficient to overcome the higher signal propagation loss due to the usage of higher transmit signal carrier frequencies.

Figure 7:
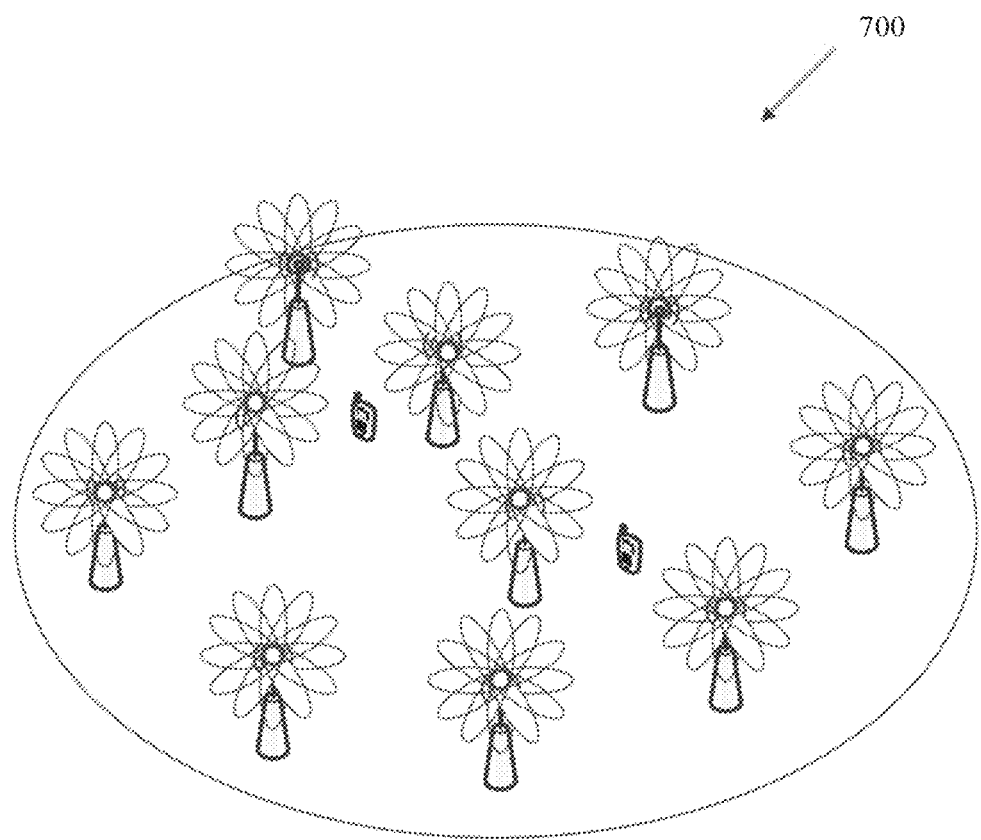
FIG. 7 illustrates an example multiple beam configuration according to embodiments of the present disclosure.

FIG. 7 illustrates an example multiple beam configuration 700 according to embodiments of the present disclosure. An embodiment of the multiple beam configuration 700 shown in FIG. 7 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

The 5G system is generally a multi-beam based system. In such a system, multiple beams are used to cover one coverage area. An example for illustration is shown in FIG. 7. As shown in FIG. 7, one gNB has one or more TRPs. Each TRP uses one or more analog beams to cover some area. To cover one UE in one particular area, the gNB use one or more analog beams to transmit and receive the signal to and from that UE. The gNB and the UE need to determine the beam(s) used for their connection. When the UE moves within one cell coverage area, the beam(s) used for this UE may be changed and switched. It was agreed in 3GPP NR RAN1 meetings that the operation of managing those beams are L1 and L2 operation In the present disclosure, a "beam" can correspond to an RS resource, whether the beam is a sounding reference signal (SRS), CSI-RS, beam RS, measurement RS, or any other type of RS. In high frequency band system (e.g., >6 GHz system), the TRP and the UE can be deployed with large number of antennas to relay on the high gain beamforming to defeat the large path loss and signal blockage. A general system configuration is that the TRP and UE have large number antenna but only one or a few TXRUs. So hybrid beamforming mechanism is utilized. Analog beams with different direction can be formulated on the antenna array that is connected to one TXRU. To get the best link quality and coverage distance, the TRP and UE need to align the analog beam directions for each particular downlink and uplink transmission.

An uplink transmission is more power limited than downlink due to the limited Tx power and battery capacity of the UE. To defeat the path loss in uplink and provide good link quality, the gNB and the UE need to select the "best" UE Tx analog beams that are supposed to point to serving gNB and the "best" TRP Rx beams that are supposed to point to the direction of that UE. To achieve this, the UE can send some uplink RS that conveys the UE Tx beams and the gNB can measure the quality of Tx beams by measuring the signal power or signal quality in the corresponding uplink RS.

The UE may be able to be configured to apply the Tx beams on the upink RS by various manners to meet the different diverse uplink beam management requirements. For example, the gNB may need to refine TRP Rx beam with respect to one UE Tx beam, and the UE may apply the same Tx beam on multiple uplink RS resources so that the gNB can apply different Rx beams. For example, the gNB and UE may need to refine Tx beam among a few analog Tx beam candidates, and the UE may apply those Tx beam candidates on different uplink RS resources and the gNB can measure the quality of those Tx beam candidates by measures the signal in corresponding RS resource. To support that, the design of uplink RS (for example NR-SRS) may support conveying the information of analog Tx beams and NR-SRS procedure may support the various schemes of analog Tx beam transmission and sweeping.

In some embodiments, a UE is configured to transmit some uplink RS. That RS can be used by the gNB to measure the quality of UE Tx beams and TRP Rx beams and then select Tx and Rx beam(s) for uplink transmission. The uplink RS can be NR-SRS, uplink CSI-RS, uplink MRS, uplink BRS (beam reference signal) or uplink BMRS (beam management RS or beam measurement RS). In the following discussion, NR-SRS is going to be used as exemplary for simplified discussion and can be substituted with other names and labels without changing the substance of this embodiment.

In one example, the configuration of NR-SRS used for the above purpose can include the setting of NR-SRS resources. In such example, the UE is configured with K≥1 NR-SRS resources. Each NR-SRS resource can contain one or more OFDM symbols and one or more antenna ports in frequency domain: the NR-SRS transmission can be periodic, semi-persistent or aperiodic; and for periodic NR-SRS, slot offset and periodicity can be configured.

In another example, the configuration of NR-SRS used for the above purpose can include the setting of UE's Tx beam sweeping for beam management. In such example, the UE can be configured the Tx beam(s) that the UE is requested to apply on the transmission of NR-SRS in one or more configured NR-SRS resources. The information of UE Tx beam can be signaled through Tx beam mode. The Tx beam mode is defined as a subset of UE Tx beams, which is going to be discussed in details in next section.

In yet another example, the configuration of NR-SRS used for the above purpose can include the setting of supporting TRP Rx beam sweeping. In such example, there can be two alternatives to support TRP Rx beam sweeping. One example is to allow gNB to sweep the Rx beams across multiple NR-SRS resources. The UE is configured to apply the same Tx beam(s) across M NR-SRS resources so that the TRP can apply different Rx beam on those M NR-SRS resources to measure the quality of those Rx beams. One example is through mapping NR-SRS signal on every R-th REs so that there are R same signal repetitions within one OFDM symbol (i.e., multiple same signal repetitions within one NR-SRS resource). Then the gNB can apply different TRP Rx beams among those repetitions to measure the quality of multiple Rx beams.

In some embodiments, one NR-SRS resource can contain one or more of the following components: one CP-OFDM/DFT-S-OFDM symbol; the bandwidth of NR-SRS in frequency domain; the number of NR-SRS antenna port(s) and indices of antenna port(s); the index of Tx beam corresponding to one NR-SRS resource; the mapping factor R, which the NR-SRS signal is mapped for every R REs so that there are R same repetitions within one symbol in time domain. Those R time-domain repetitions can be used by the gNB to sweep TRP Rx beams; and subcarrier spacing multiplier factor X, in which the NR-SRS symbols use subcarrier spacing X times of reference subcarrier spacing so that there are X short symbols within one CP-OFD/DFT-S-OFDM symbol in one NR-SRS resource.

One NR-SRS resource can contain multiple consecutive CP-OFDM/DFT-S-OFDM symbols and one resource can contain one or more of the following components: the number of CP-OFDM/DFT-S-OFDM symbols; the bandwidth of NR-SRS; The bandwidth and subband of NR-SRS can be same for all symbols in one NR-SRS resource. The bandwidth and subband of NR-SRS on different symbols in one NR-SRS resource can be different; the number of NR antenna port(s) and the indices of antenna port(s); and the index or indices of Tx beam corresponding to one NR-SRS resource.

In one example, one Tx beam corresponds to one NR-SRS resource. In one example, each CP-OFDM/DFT-S-OFDM symbol corresponds to one Tx beam; the mapping factor R, which the NR-SRS signal is mapped for every R REs; and subcarrier spacing multiplier factor X, in which the NR-SRS symbols use subcarrier spacing X times of reference subcarrier spacing so that there are X short symbols within one CP-OFD/DFT-S-OFDM symbol in one NR-SRS resource.

There are multiple different schemes for Tx beam sweeping in NR-SRS resource. A few possible schemes are summarized as follows. In one example of NR-SRS resource with only one CP-OFDM/DFT-S/-OFDM symbol, the UE can be configured with: one Tx beam can correspond to one NR-SRS resource; one Tx beam can correspond to one antenna port in one NR-SRS resource; and/or one Tx beam can correspond to one subset of antenna ports in one NR-SRS resource.

In another example NR-SRS resource with multiple CP-OFDM/DFT-S-OFDM symbols, the UE can be configured with: one Tx beam can correspond to one NR-SRS resource; one Tx beam can correspond to one CP-OFDM/DFT-S-OFDM symbol in one NR-SRS resource; one Tx beam can correspond to multiple CP-OFDM/DFT-S-OFDM symbols in one NR-SRS resource; one Tx beam can correspond to one or a subset of antenna port in one NR-SRS resource; and/or one Tx beam can correspond to one or a subset of antenna ports in one or multiple CP-OFDM/DFT-S-OFDM symbols in one NR-SRS resource In some embodiments, the location of CP-OFDM/DFT-S-OFDM symbol of one NR-SRS transmission can be dynamically configured. The UE can be configured with the following information and can be requested to transmit the NR-SRS as configured symbol index: the slot index; and/or the index of CP-OFDM/DFT-S-OFDM symbol in one slot.

In one example, the UE is configured with K≥1 NR-SRS resources and the configuration for each NR-SRS resource can contain index of a starting CP-OFDM/DFT-S-OFDM symbol. If the NR-SRS resource contains only one symbol that is the symbol index where the NR-SRS is transmitted. If the NR-SRS resource contains multiple symbols, that can be the index of symbol for first NR-SRS symbol or the index of symbol for the last NR-SRS symbol.

In another example for aperiodic NR-SRS transmission, the UE is configured with K≥1 NR-SRS resources through RRC signaling and one symbol index can also be configured for each configured NR-SRS resource through RRC signaling. The UE is requested to transmit each of NR-SRS resources on the configured symbol index.

In yet another example, the information of symbol index can be dynamically configured for each triggered aperiodic NR-SRS transmission. The UE can be configured with K≥1 NR-SRS resources. The UE can be requested to transmit M of K NR-SRS resources dynamically and the trigger can be signaled through MAC-CE or L1 signaling (e.g., DCI). Along with the trigger message, the UE can be configured with a symbol index for each of M triggered M NR-SRS resources. A default symbol index can be configured for each NR-SRS resources through RRC signaling or predefined. For each triggered transmission, if the trigger message configures symbol index information for the NR-SRS resource, the UE can be requested to apply the symbol index information to the NR-SRS transmission as indicated in the trigger message. If the trigger message does not configure symbol index information for the NR-SRS resource or explicitly indicates the UE to use the default timing, the UE can be requested to apply the configured default symbol index to the NR-SRS transmission.

For Semi-persistent NR-SRS transmission, in one example, the information of symbol index for each NR-SRS can be configured through RRC signaling (e.g., as part of the NR-SRS resource configuration). In another example, the information of symbol index for each NR-SRS can be dynamically configured in the activation message. The activation message can be signaled in MAC-CE or L1 signaling (e.g., DCI). In such examples, the gNB can dynamically adjust the timing of NR-SRS transmission for every activated transmission. In a third example, a default timing (symbol index) is configured as part of the NR-SRS resource configuration through RRC signaling and a new timing (symbol index) can be configured in the activation message for each activated transmission. In such example, if there is no timing information configured in the activation message, the UE can be requested to use the configured default symbol index; if there is timing information configured in the activation message, the UE can be requested to use the timing information configured by activation message. In one example for periodic NR-SRS transmission, the timing (i.e., the symbol index in one slot) can be configured for each of K NR-SRS resources.

In some embodiments, a sub-time unit feature can be configured to one NR-SRS resource to support the Tx beam repetition in time domain within one NR-SRS resource. When the sub time unit feature is on, the UE can be requested to apply same Tx beam on the entire sub time unit within one NR-SRS resource. In one example, a sub-time unit can be realized through short OFDM symbol. The UE can be configured with a NR-SRS resource and a sub time unit scale factor a. Example values of a can be 1, 2, 4, 8. For semi-persistent NR-SRS, the activation message can signal one-bit field to indicate the off and on of sub-time unit feature in the activated NR-SRS transmission. In another example, the value of one-bit field being 1 can indicates that sub-time unit feature is on in the activated NR-SRS transmission and the UE can be requested to apply the configured scale factor a in the NR-SRS transmission. For aperiodic NR-SRS, the trigger message the can signal one-bit field to indicate the off and on of sub-time unit feature in the triggered NR-SRS transmission. In yet another example, the value of one-bit field being 1 can indicates that sub-time unit feature is on in the triggered NR-SRS transmission and the UE can be requested to apply the configured scale factor a in the NR-SRS transmission.

In one embodiment, a sub-time unit can be realized through IFDMA. The UE can be configured with a NR-SRS resource and a sub time unit scale factor a. Example values of a can be 1, 2, 4, 8. For semi-persistent NR-SRS, the activation message can signal one-bit field to indicate the off and on of sub-time unit feature in the activated NR-SRS transmission. In one example, the value of one-bit field being 1 can indicates that sub-time unit feature is on in the activated NR-SRS transmission and the UE can be requested to apply the configured scale factor a in the NR-SRS transmission. For aperiodic NR-SRS, the trigger message the can signal one-bit field to indicate the off and on of sub-time unit feature in the triggered NR-SRS transmission.

In one example, the value of one-bit field being 1 can indicates that sub-time unit feature is on in the triggered NR-SRS transmission and the UE can be requested to apply the configured scale factor a in the NR-SRS transmission.

In some embodiments, a sub-time unit feature can be configured to one NR-SRS resource to support the Tx beam repetition in time domain within one NR-SRS resource. When the sub time unit feature is on, the UE can be requested to sweep the Tx beams across the entire sub time unit within one NR-SRS resource.

In some embodiments, a set or a subset of Tx beam indices can be signaled to the UE and the UE is requested to apply the indicated UE Tx beams on the NR-SRS transmission so that the gNB can measure the quality of UE Tx beams and/or TRP Rx beams. The configuration of UE Tx beams can be signaled through higher layer signaling (for example RRC message) and/or L2 signaling (e.g., MAC-CE) or L1 signaling (e.g., UL-related DCI).

In the present disclosure, it is noted there exist different ways of mapping between Tx beams and NR-SRS resource, antenna port and symbols. In the present disclosure, a scheme of Tx beam corresponding to one NR-SRS resource is exemplary and can be substituted with other schemes and labels without changing the substance of this embodiment.

In some embodiments, the UE can be configured with following information and can be requested to apply the configured Tx beams on the configured NR-SRS resources. In one example of the information of one or a subset of a set of NR-SRS resources, the information can include the number of selected NR-SRS resources and the indices of NR-SRS resources, e.g., M NR-SRS resource out of K NR-SRS resources configured through RRC signaling. In another example of the information of Tx beams that the UE is requested to apply on the NR-SRS resource, the information can include the number of Tx beams and the indices of Tx beams. The information can also include the example for UE to select one or a subset or set or all the Tx beams. In yet another example of the information of mapping between configured/selected Tx beam indices and NR-SRS resources, the information can be signaled through a Tx beam state information.

Each NR-SRS resource can correspond to one Tx beam index. Different NR-SRS resource in NR-SRS transmission can correspond to one same Tx beam index. Different NR-SRS resource in NR-SRS transmission can correspond to different Tx beam indices There may be a few schemes for a gNB configuring the information of UE Tx beams for the NR-SRS transmission. Such schemes can be useful in various UL beam management scenarios. Some example schemes are listed here and will be discussed in detail in the following sections. In one example, the UE is configured to use one indicated Tx beam mode on M≥1 transmitted NR-SRS resources. In another example, the UE is configured to select one Tx beam mode and then apply the selected Tx beam mode on M≥1 NR-SRS resources. In yet another example, the UE is indicated with M Tx beam modes and M NR-SRS resources and the UE is requested to use each indicated Tx beam mode on each indicated NR-SRS resource. In yet another example, the UE is configured to select M different Tx beams and then use each selected Tx beam on each of M≥1 indicated NR-SRS resources.

In some embodiments of scheme 1, the UE receives an indication to transmit NR-SRS signals on M≥1 configured NR-SRS resources with one indicated UE Tx beam mode. This scheme is useful for gNB to measure the quality of multiple different TRP Rx beams with respect to one selected UE Tx beam and then the gNB can select the 'best' Rx beam to receive the uplink transmission. In this scheme, the UE can be configured with the following information: the ID of M NR-SRS resources (out of K NR-SRS resources, which can be configured through RRC signaling); the information of one UE Tx beam, e.g. one beam ID $B_i$; and the information of mapping between NR-SRS resources and Tx beam index. In this instance, the UE is configured to apply the same Tx beam ID $B_i$ (as indicated by the gNB) on those M indicated NR-SRS resources and fix the same indicated Tx beam on those M indicated NR-SRS resource. In one example, a few bits are used to indicate the Tx beam state information and state 0 indicates this scheme.

In such scheme, the NR-SRS resources correspond to the same Tx beam index that is configured to the UE. The UE is configured to apply the indicated Tx beam mode on the NR-SRS signal and then transmit the NR-SRS signals on the indicated M NR-SRS resources. The gNB can use different Rx beams to receive different NR-SRS resources and then measure the signal quality in each NR-SRS, e.g. the signal RSRP or the CQI or the beam CSI. The gNB can indicate the measurement result to the UE. In one example, the gNB can indicate one beam quality (e.g., beam RSRP or CQI) that corresponds to the best Rx beam.

In some embodiments of scheme 2, the UE receives an indication to transmit NR-SRS signals on M≥1 configured NR-SRS resources with the same UE Tx beam mode and the UE is requested to select on Tx beam mode. This embodiment is useful for gNB to measure the quality of multiple TRP Rx beams with respect to one Tx beam mode that the UE desires to use. In this embodiment, the UE can be indicated with the following information: the ID of M NR-SRS resources (out of K NR-SRS resources, which can be configured through RRC signaling); the number of Tx beams the UE is indicated to select, in this embodiment, the number of Tx beams is $N_B=1$; and indication information to configure the UE to select one Tx beam and the apply the selected Tx beam on those M NR-SRS resource and also fix this selected Tx beam on those configured M NR-SRS resource. In one instance, such scheme can be indicated through the Tx beam state information. A few bits are used to indicate the Tx beam state information and State 1 indicates this embodiment.

In such scheme, the M NR-SRS resource in NR-SRS transmission would correspond to one same Tx beam index that the UE is configured to select. The UE is configured (as indicated by State 1) to first select one Tx beam mode and then apply the selected Tx beam mode on the NR-SRS signals that are transmitted on M indicated NR-SRS resources. The gNB can apply different Rx beams to receive the NR-SRS signal on those M NR-SRS resources and measure the signal quality in each NR-SRS, e.g. the signal RSRP or the CQI or the beam CSI.

In some embodiments of scheme 3, the UE can be configured to apply different indicated Tx beams on the NR-SRS signals on different NR-SRS resources. This embodiment can be used by the gNB to configure the UE to sweep multiple Tx beams across NR-SRS resources and then the gNB can measure and select the best UE Tx beams. In this scheme, the UE can be configured with the following information to the UE. In one example, M≥1 NR-SRS resource-Tx beam pair $S_i=\{B_{TX,i}, SRS_i\}$, where $SRS_i$ is the ID of one NR-SRS resource and $B_{TX,i}$ is the ID of one Tx beam (e.g., one Tx beam mode). In such example, the M NR-SRS resources can be selected out of K NR-SRS resources, which can be configured through RRC signaling.

In another example, the mapping information between indicated Tx beam indices and NR-SRS resources. Indication information to configure the UE to apply each Tx beam mode $B_{TX,i}$ on corresponding NR-SRS resource $SRS_i$. In such example, the mapping information can be indicated through the Tx beam state information. A few bits are used to indicate the Tx beam state information and State 2 indicates this scheme. In such scheme, each NR-SRS resource correspond to one Tx beam index and different NR-SRS resource can correspond to different Tx beam indices. The UE is configured to apply each indicated Tx beam on the NR-SRS signal transmitted on each corresponding NR-SRS resource. The gNB can measure the signal quality of NR-SRS signal on each of those M NR-SRS resources, e.g. the signal RSRP or the CQI or the beam CSI and then determine the best beam out of those M configured Tx beams.

In some embodiments of scheme 4, the UE can be configured to first choose multiple Tx beams and then apply each selected Tx beam on each of indicated NR-SRS resources. This embodiment can be used by the gNB to measure multiple Tx beams that the UE desires to train and then determine the best Tx beam for uplink transmission. The embodiments are useful in the case when the gNB and UE do not have any prior information on "best" beam for uplink. With this embodiment, the gNB and the UE are able to first train multiple available Tx beams and then, based on the output of this embodiment, the gNB and the UE can further refine the Tx beam and TRP Rx beams. In such embodiments, the UE can be indicated with the following information. In one example, the ID of M NR-SRS resources (out of K NR-SRS resources, which can be configured through RRC signaling). In another example, indication information to configure the UE to select M Tx beam mode and apply each selected Tx beam mode on each of those M NR-SRS resource. In such instance, indication information that can be indicated through the Tx beam state information. A few bits are used to indicate the Tx beam state information and State 3 indicates this scheme.

The gNB can measure the signal quality of NR-SRS signal on those M NR-SRS resources, e.g. the signal RSRP or the CQI or the beam CSI, and then determine the best beam out of those M Tx beams. The gNB can report the measurement result to the UE. In one example, the gNB can report the information of Tx beam ID and the corresponding beam quality information (e.g., Tx beam-specific RSRP, beam CQI or beam CSI). The information of Tx beam ID can be indicated by the ID of NR-SRS resource. In another example, the gNB can report the information of N≥1Tx beams. The reporting information can include: the ID information of Tx beams, which can be indicated by the ID of NR-SRS resource where the corresponding beam quality is measured; the beam quality information of each reported Tx beam, e.g., beam-specific RSRP, CQI or CSI; and a sorted list of Tx beam IDs. The sort of Tx beam IDs can indicate the relative beam quality. For example, the gNB indicates one list of NR-SRS resource IDs {$SRS_{i1}$, $SRS_{i2}$, . . . , $SRS_{iN}$}. The beam quality of Tx beam applied to those N indicated NR-SRS is in a descent (or an ascent) order as in the indicated list.

Figure 8A:
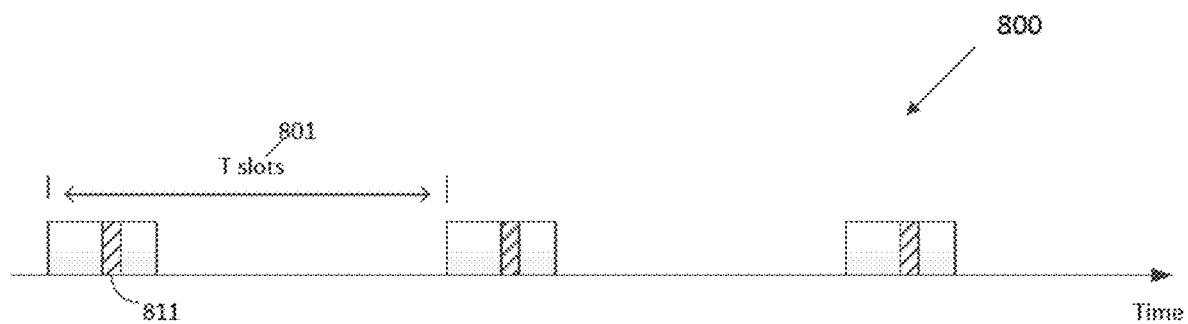
FIG. 8A illustrates an example NR-SRS resource according to embodiments of the present disclosure.

FIG. 8A illustrates an example NR-SRS resource 800 according to embodiments of the present disclosure. An embodiment of the NR-SRS resource 800 shown in FIG. 8A is for illustration only. One or more of the components illustrated in FIG. 8A can be implemented in specialized circuitry configured to perform the noted functions or one or more of the components can be implemented by one or more processors executing instructions to perform the noted functions. Other embodiments are used without departing from the scope of the present disclosure.

Figure 8B:
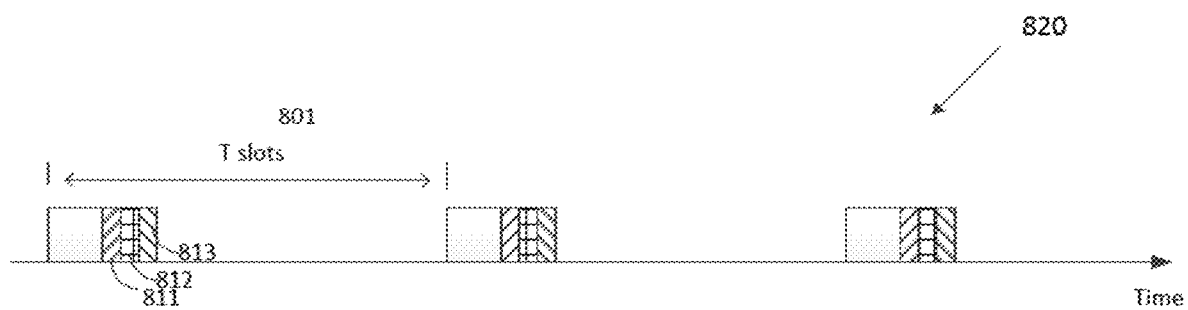
FIG. 8B illustrates another example NR-SRS resource according to embodiments of the present disclosure.

FIG. 8B illustrates another example NR-SRS resource 820 according to embodiments of the present disclosure. An embodiment of the NR-SRS resource 820 shown in FIG. 8B is for illustration only. One or more of the components illustrated in FIG. 8B can be implemented in specialized circuitry configured to perform the noted functions or one or more of the components can be implemented by one or more processors executing instructions to perform the noted functions. Other embodiments are used without departing from the scope of the present disclosure.

Figure 8C:
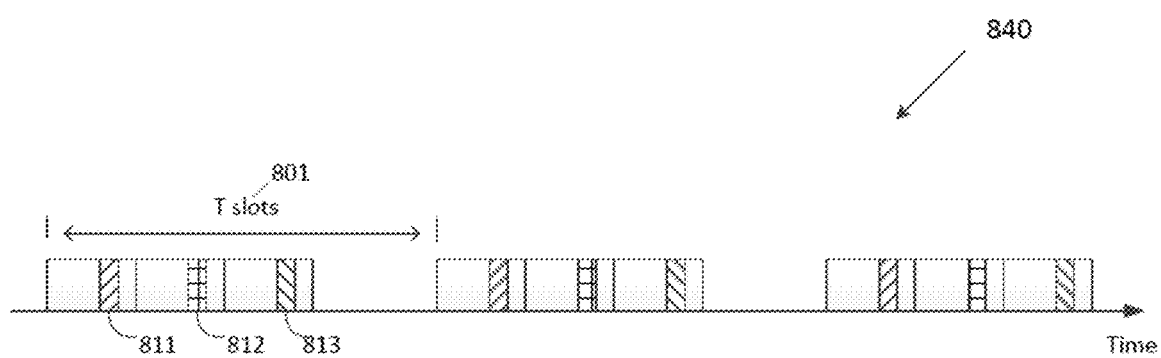
FIG. 8C illustrates yet another example NR-SRS resource according to embodiments of the present disclosure.

FIG. 8C illustrates yet another example NR-SRS resource 840 according to embodiments of the present disclosure. An embodiment of the NR-SRS resource 840 shown in FIG. 8C is for illustration only. One or more of the components illustrated in FIG. 8C can be implemented in specialized circuitry configured to perform the noted functions or one or more of the components can be implemented by one or more processors executing instructions to perform the noted functions. Other embodiments are used without departing from the scope of the present disclosure.

The NR-SRS can be periodic, semi-persistent and/or aperiodic. In periodic NR-SRS, the UE is configured to transmit on one or more NR-SRS resources periodically, e.g., with periodicity being T slots. The periodic NR-SRS can have one NR-SRS resource and the UE transmits on that NR-SRS resource periodically. An example is shown in FIG. 8A. In this example, the UE is requested to transmit on NR-SRS resource 811 with periodicity T slots 801. The periodic NR-SRS can contain multiple NR-SRS resources and the UE is requested to transmit on those configured NR-SRS resources periodically. An example is shown FIG. 8B. In this example, there are three NR-SRS resources 811, 812 and 813. The UE is requested to transmit on these three NR-SRS resource with periodicity T slots 801. Those NR-SRS resources can be allocated on contiguous CP-OFDM/DFT-S-OFDM symbols within one slot, as shown in the example in FIG. 8B. Those NR-SRS resources can be distributed in different slots, as shown in the example in FIG. 8C.

In some embodiments, a UE can be configured Tx beam(s) (for example, by a gNB) for the periodic NR-SRS transmission and the UE is requested to apply the Tx beam(s) on NR-SRS transmission as indicated. In one example, a UE can receive an indication associated with one Tx beam (for example, from a gNB) for the periodic NR-SRS with one resource. The indication can be sent in MAC-CE or L1 signaling (e.g., DCI). The UE is requested to start using the indicated Tx beam on each NR-SRS transmission at $N_d$≥1 slots after receive the indication from the gNB. The value of $N_d$ can be predefined in the spec or signaled from the gNB to the UE through RRC, MAC-CE or L1 signaling. The UE can be requested to use the indicated Tx beam until new indication is received from the gNB.

Figure 9A:
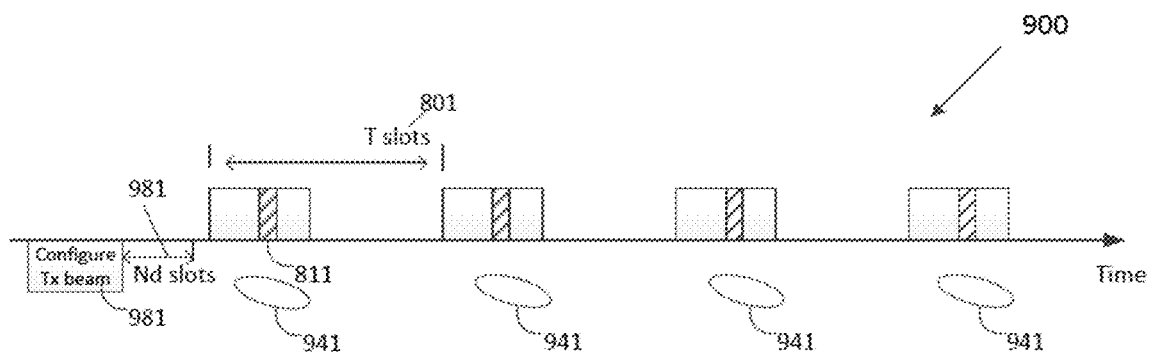
FIG. 9A illustrates yet another example NR-SRS resource according to embodiments of the present disclosure.

FIG. 9A illustrates yet another example NR-SRS resource 900 according to embodiments of the present disclosure. An embodiment of the NR-SRS resource 900 shown in FIG. 9A is for illustration only. One or more of the components illustrated in FIG. 9A can be implemented in specialized circuitry configured to perform the noted functions or one or more of the components can be implemented by one or more processors executing instructions to perform the noted functions. Other embodiments are used without departing from the scope of the present disclosure.

An example is shown in FIG. 9A. As illustrated in FIG. 9A, the UE can be configured with one Tx beam 941 to the UE at 981. After a configured or predefined delay, 981, after the UE receiving the Tx beam configuration, the UE begin to use the configured Tx beam 941 on the NR-SRS transmission in NR-SRS resource 811. The NR-SRS is transmitted on NR-SRS resource 811 periodically with periodicity T slots 801. The UE is requested to use the configured Tx beam 941 on each NR-SRS transmission.

Figure 9B:
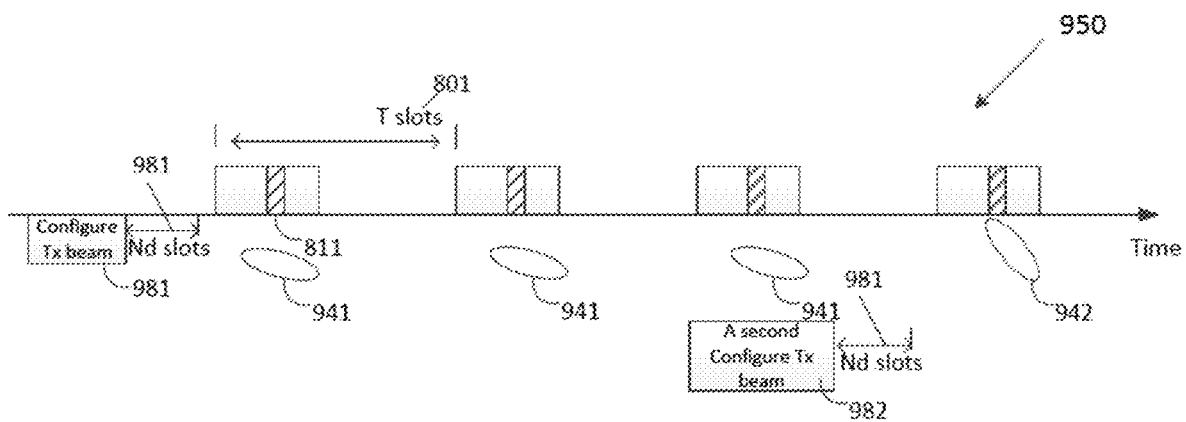
FIG. 9B illustrates yet another example NR-SRS resource according to embodiments of the present disclosure.

FIG. 9B illustrates yet another example NR-SRS resource 950 according to embodiments of the present disclosure. An embodiment of the NR-SRS resource 950 shown in FIG. 9B is for illustration only. One or more of the components illustrated in FIG. 9B can be implemented in specialized circuitry configured to perform the noted functions or one or more of the components can be implemented by one or more processors executing instructions to perform the noted functions. Other embodiments are used without departing from the scope of the present disclosure.

An example is shown in FIG. 9B, where the UE switches to another Tx beam for the NR-SRS transmission after receiving a second Tx beam configuration from the gNB. As illustrated in FIG. 9B, the UE can be configured with one Tx beam 941 to the UE at 981. The UE is requested to use the Tx beam 941 on NR-SRS transmission after $N_d$ slots 981. The UE receives a second Tx beam configuration 982 from the gNB. Then after $N_d$ slots 981 after receiving a second Tx beam configuration 982, the UE is requested to use the configured Tx beam 942 on the NR-SRS transmission.

In one example, the UE can be indicated with $N_T \geq 1$ Tx beams a periodic NR-SRS transmission with one resource. The UE is requested to cycle the indicated Tx beams on the periodic NR-SRS transmission. This example can be used by the UE to sweep multiple Tx beams across the periodic NR-SRS transmission so that the gNB can measure the beam quality of multiple different Tx beams periodically. In this example, the UE can be configured with the following information: a list of Tx beam ID $\{B_1, B_2, \ldots, B_{N_T}\}$; and a slot offset, $N_d$ slot. The UE is requested to begin use the configured Tx beams $N_d$ slots after receiving the configuration message.

Figure 9C:
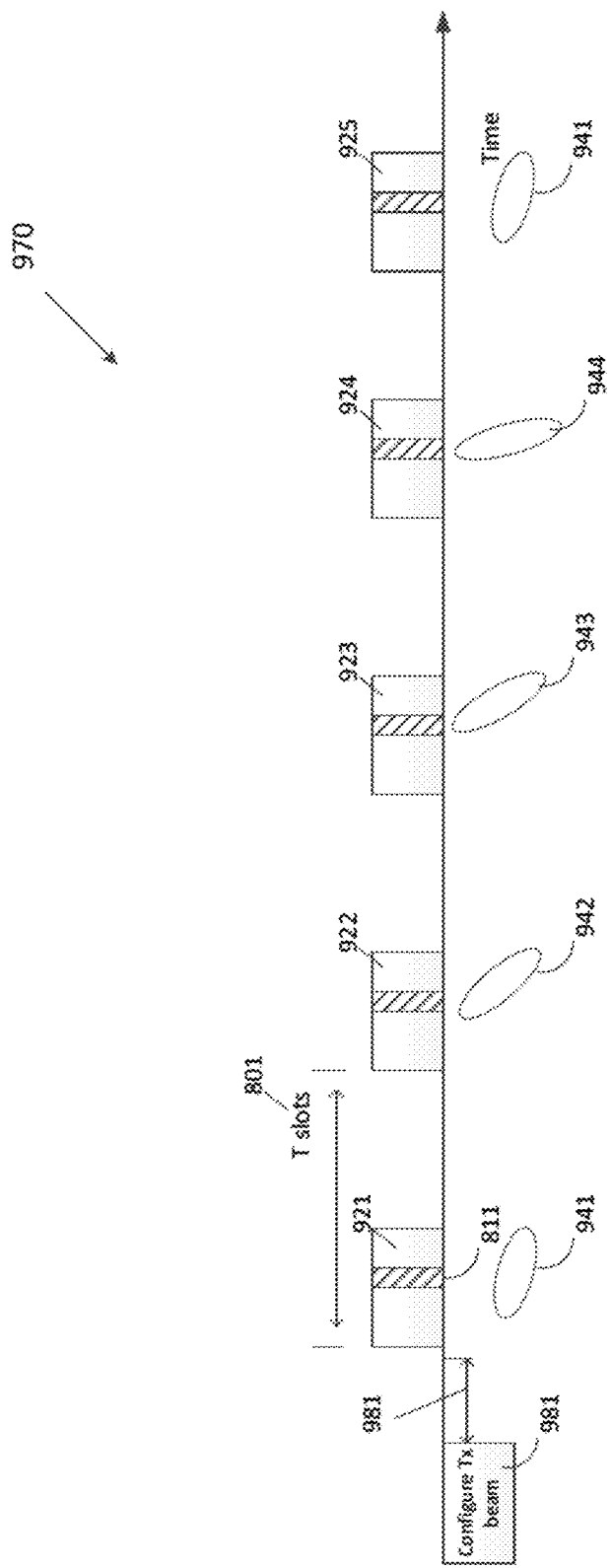
FIG. 9C illustrates yet another example NR-SRS resource according to embodiments of the present disclosure.

FIG. 9C illustrates yet another example NR-SRS resource 970 according to embodiments of the present disclosure. An embodiment of the NR-SRS resource 970 shown in FIG. 9C is for illustration only. One or more of the components illustrated in FIG. 9C can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 9C, the UE is configured with 4. Tx beams (941, 942, 943 and 944) through Tx beam configuration message at $N_d$ slot 981. The UE is requested to use each of those Tx beams on each NR-SRS transmission. The UE uses Tx beam 941 on a first NR-SRS transmission 921, then uses Tx beam 942 on the a second NR-SRS transmission 922 after T slots 801, and uses Tx beam 943 on a third NR-SRS transmission 923 and Tx beam 944 on a forth NR-SRS transmission 924. Then the UE is requested to use Tx beam 941 on NR-SRS transmission 925. In this manner, the UE sweeps 4 Tx beams 941-944 across every four NR-SRS transmission.

In one example, the UE can be configured with a value of $N_T$. The UE is requested to select $N_T$ Tx beams and then sweep those selected Tx beams across the periodic NR-SRS transmission. Take the example shown in FIG. 9C for instance, the UE is indicated with $N_T=4$. The UE selects 4 Tx beams 941, 942, 943 and 944. As configured, the UE sweeps those four selected Tx beams on the periodic NR-SRS transmission until new indication is received.

For the periodic NR-SRS transmission with $M \geq 1$ resources (examples shown in FIGS. 8B and 8C), the UE can be configured with one or more Tx beams and the UE is requested to apply the indicated Tx beams on periodic NR-SRS transmission. In one embodiment, the UE can be configured with M Tx beams to the UE and the UE is requested to use each indicated Tx beam on each of those M NR-SRS resources. In this embodiment, each NR-SRS transmission periodicity contains M NR-SRS resources. The UE sweeps M Tx beams across the NR-SRS resources within one NR-SRS transmission periodicity. This embodiment can be used for the case that the UE can sweep Tx beams within each NR-SRS transmission and the gNB can sweep the TRP Rx beams across NR-SRS transmissions. In one NR-SRS transmission, the gNB can measure the beam quality of multiple Tx beams with respect to one TRP Rx beam and then the gNB can measure the beam quality with respect to another TRP Rx beam in another NR-SRS transmission. This embodiment can also be used by gNB to monitor the beam quality of multiple Tx beam periodically.

Figure 10:
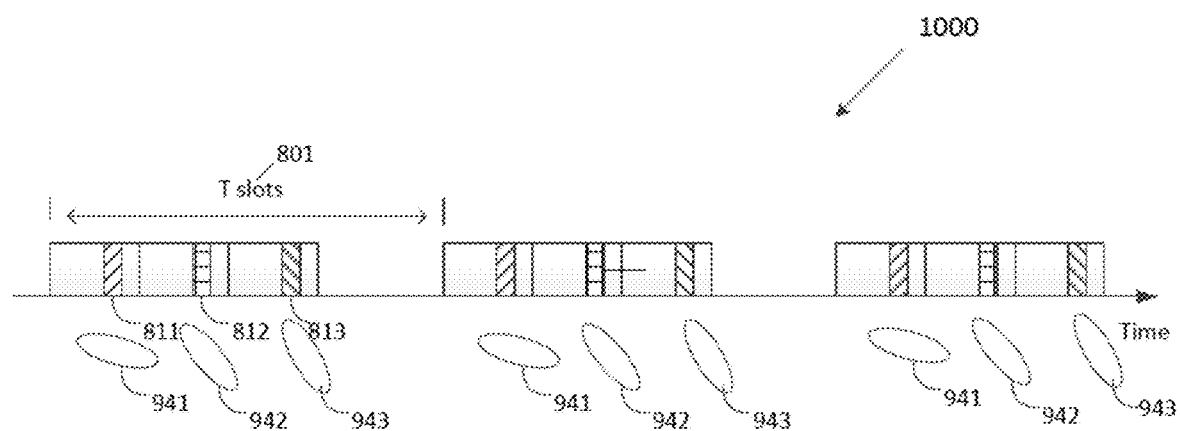
FIG. 10 illustrates an example periodic NR-SRS transmission according to embodiments of the present disclosure.

FIG. 10 illustrates an example periodic NR-SRS transmission 1000 according to embodiments of the present disclosure. An embodiment of the periodic NR-SRS transmission 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 10, the periodic NR-SRS transmission has three NR-SRS resources 811, 812 and 813. The NR-SRS is transmitted periodically after every T slots. The UE can be configured with three Tx beams 941, 942, and 943 to the UE. The UE is configured to use each of those three Tx beams on each of three NR-SRS resources 811, 812, and 813. The UE uses Tx beam 941 on NR-SRS resource 811, Tx beam 942 on NR-SRS resource 812 and Tx bam 943 on NR-SRS resource 813 in one NR-SRS transmission. The UE repeats sweeping those three indicated Tx beams in every NR-SRS periodicity until new indication is received.

In one example, the UE can be configured with $M \times N_T$ Tx beams to the UE and the UE is requested to sweep the indicated Tx beams across every $N_T$ NR-SRS transmission periodicities. In this example, each NR-SRS transmission periodicity contains M NR-SRS resources. The UE sweeps $M \times N_T$ Tx beams across the $M \times N_T$ NR-SRS resources across $N_T$ NR-SRS transmission periodicities. This example is useful when the UE has more Tx beams than NR-SRS resources in one NR-SRS transmission. In such example, the UE sweeps the Tx beams across the NR-SRS resources in multiple contiguous NR-SRS transmission periodicities and the gNB can sweep the TRP Rx beams across the NR-SRS transmission bursts (each NR-SRS transmission burst has $N_T$ contiguous NR-SRS transmission)

Figure 11:
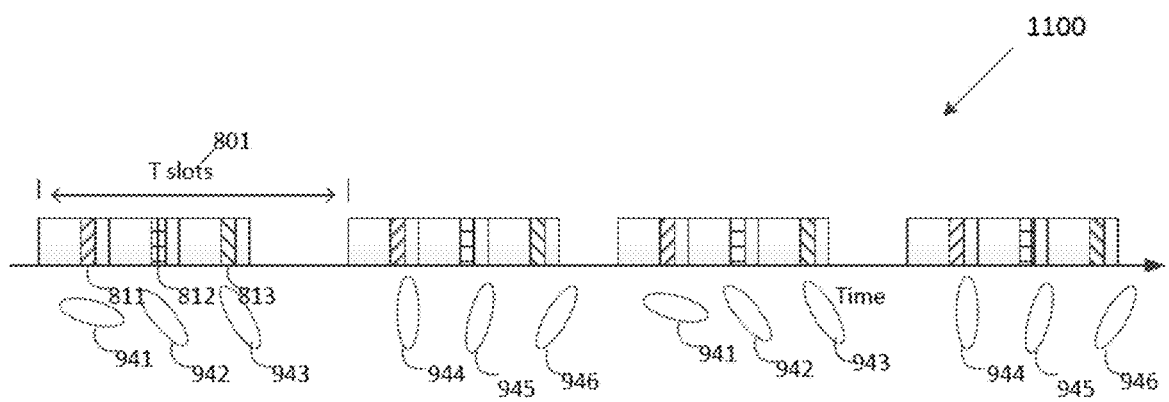
FIG. 11 illustrates another example periodic NR-SRS transmission according to embodiments of the present disclosure.

FIG. 11 illustrates another example periodic NR-SRS transmission 1100 according to embodiments of the present disclosure. An embodiment of the periodic NR-SRS transmission 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 11, the periodic NR-SRS transmission has three NR-SRS resources 811, 812, and 813, and the NR-SRS is transmitted periodically after every T slots. In this example, the UE is indicated with 6 Tx beams 941, 942, 943, 944, 945, and 946. The UE is requested to sweep those 6 Tx beams across 6 NR-SRS resources within two NR-SRS transmission periodicities. As illustrated in FIG. 11, the UE utilizes Tx beam 941 on NR-SRS resource 811, Tx beam 942 on NR-SRS resource 812, and Tx beam 943 in NR-SRS resource 813 in a first NR-SRS periodicity. Then in a second NR-SRS periodicity, the UE utilizes Tx beams 944, 945, and 946 on those three NR-SRS resources. Those six configured Tx beams are repeated across every two NR-SRS periodicities. This embodiment is useful for the case where the gNB needs to measure large number of UE Tx beam for UL beam management.

In one example, the UE can be configured with a value of $N_T$. The UE is requested to select $M \times N_T$ Tx beams and then utilize those selected Tx beams on the $N_T$ NR-SRS periodicities. Take the example shown in FIG. 11 for instance, the UE is configured with $N_T=2$ and the NR-SRS has 3 resources. The UE selects 6 Tx beams 941-946. As configured, the UE can sweep those six selected Tx beams across every six NR-SRS resources within every two periodicities until new indication is received.

In one example, a UE can be configured with K periodic NR-SRS resources. The UE can assume to apply different Tx beams on those NR-SRS resources. The UE can be configured with measurement window on one periodic NR-SRS resource. Within one measurement window, the UE can be requested to keep the same Tx beam on the NR-SRS transmission on that NR-SRS resource. Between two measurement windows, the UE can change the Tx beam on the NR-SRS transmission on that NR-SRS resource. In one instance, the measurement window can be configured with slot offset with the starting time of the first measurement window no and slot length of one measurement window, for example, number of slot $N_M$ (e.g., a number of periodicity).

In one example, the same single measurement window configuration can be configured to K periodic NR-SRS resource. In one example, on single measurement window configuration can be configured to a subset of K periodic NR-SRS resource. In one example, the same slot offset for measurement window can be configured to all periodic NR-SRS resource to one UE and the measurement window length can be configured to each periodic NR-SRS resource separately. In one example, slot offset can be configured for each periodic NR-SRS separately and the same single measurement window length is configured to all periodic NR-SRS resources.

In one embodiment, the UE can be configured to switch the Tx beam applied to one periodic NR-SRS resource. In one example, the MAC-CE signaling can be used to signal one or more SRI(s) (or CRI(s)) for the UE to determine the Tx beam for the NR-SRS transmission after receiving that MAC-CE signaling. In one example, DCI can be used to signal one or more SRI(s) (or CRI(s)) for the UE to determine the Tx beam for the NR-SRS transmission after receiving that DCI signaling.

Figure 12:
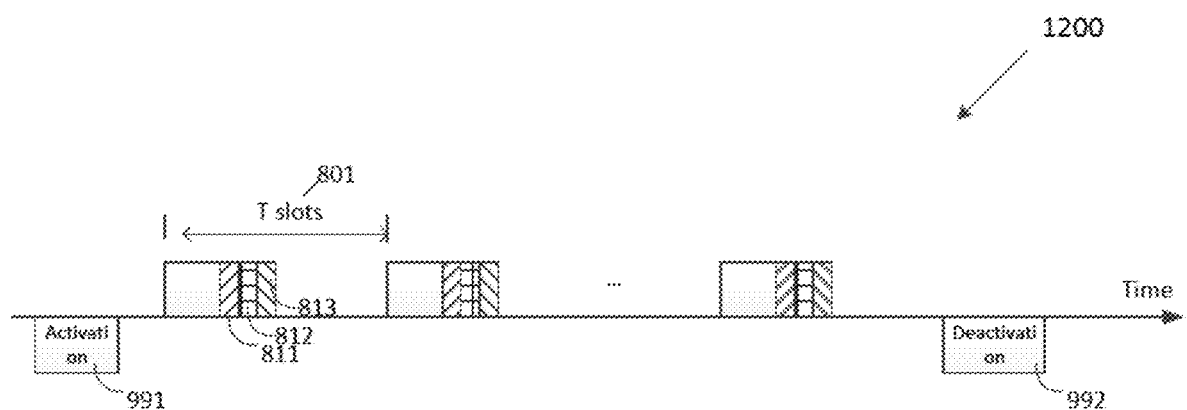
FIG. 12 illustrates an example NR-SRS transmission according to embodiments of the present disclosure.

FIG. 12 illustrates an example NR-SRS transmission 1200 according to embodiments of the present disclosure. An embodiment of NR-SRS transmission 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions. Other embodiments are used without departing from the scope of the present disclosure.

In semi-persistent NR-SRS transmission, K NR-SRS resources can be configured through RRC signaling and the UE can be activated with the semi-persistent NR-SRS transmission on M NR-SRS resources (out of K configured resources). The UE is requested to transmit on those M indicated NR-SRS resources with periodicity=T slots until the UE receives the indication of deactivation from the gNB. An example is shown in FIG. 12. The UE receives the activation indication 991 to request to the UE to start the NR-SRS transmission on NR-SRS resources 811, 812, and 813, with periodicity=T slots. In each NR-SRS periodicity, the UE transmits on three NR-SRS resources 811, 812, and 813. The UE continues the periodic transmission until a deactivation 992 is received from the gNB.

For activation and deactivation, several examples can be utilized. In one example, MAC CE can used to activate and/or deactivate the K NR-SRS resources. Separate activation MAC CE and deactivation/release MAC CE can be used. Alternatively, activation MAC CE which includes information associated with K configured NR-SRS resources and activation duration can be used without deactivation MAC CE. Alternatively, activation MAC CE which includes information associated with K configured NR-SRS resources without deactivation MAC CE. Therefore, a new reception of activation MAC CE can be interpreted as reconfiguration of the K assigned NR-SRS resources.

In another example, DCI (either UL-related or DL-related) transmitted over an L1 DL control signaling can be used to activate and/or deactivate the K NR-SRS resources. Separate activation DCI and deactivation/release DCI can be used. Alternatively, activation DCI which includes information associated with K configured NR-SRS resources and activation duration can be used without deactivation DCI. Alternatively, activation DCI which includes information associated with K configured NR-SRS resources without deactivation DCI. Therefore, a new reception of activation DCI can be interpreted as reconfiguration of the K assigned NR-SRS resources.

In some embodiments, the UE can be configured with a set or subset of Tx beams that the UE is requested to use on the NR-SRS signals in semi-persistent NR-SRS. The embodiment is similar to the embodiment used for periodic NR-SRS can be used here for semi-persistent NR-SRS. The detailed discussion is omitted here for simplicity. For aperiodic NR-SRS transmission, those embodiments discussed in previous section can be used by the gNB to indicate the Tx beams to the UE.

In some embodiments, the UE can be configured with NR-SRS resource grouping information and the UE is requested to apply the Tx beams following some manner determined by the NR-SRS resource grouping information. This mechanism is useful to train the analog beams of each individual antenna panel or array in the UE with multiple Tx antenna panels or arrays.

In the UE with two or more Tx antenna panels or arrays, the analog beams on the same panel or array can be used on the same OFDM symbol. But the analog beams on different panel or array can be used on the same OFDM symbol. To train the analog beams of UE with multiple Tx antenna panels, one way is one composite beam comprising of multiple Tx analog beams from multiple Tx antenna panels corresponds to one NR-SRS resources and then such composite beams sweep across NR-SRS resources. The drawback for this scheme is that the beams from each individual antenna panel are not visible to the gNB. Another scheme is that the UE map each antenna panel to one NR-SRS resource group and then the gNB can measure and select the beams of each NR-SRS resource group.

In one example, the UE is configured with K NR-SRS resources and the grouping information on those K NR-SRS resources. The configuration information can contain: configuration of each NR-SRS resource of K NR-SRS resources; number of NR-SRS resource groups that those K NR-SRS resources are partitioned into; and the indices of NR-SRS resources in each NR-SRS resource group.

The UE can be requested to apply the Tx beams on the NR-SRS resources as follows: the UE sweeps the Tx beams across NR-SRS resources in each NR-SRS resource group; the set of Tx beams applied on different NR-SRS resource group can be same or different; and the gNB may select one or more Tx beams (i.e., NR-SRS resource) among each NR-SRS resource group.

In one embodiment for aperiodic NR-SRS transmission, the UE is configured with K NR-SRS resources through the RRC signaling. Then the UE is requested to transmit a set of M<K NR-SRS resources through the triggering indication in MAC-CE or L1 signaling. In the triggering message, the NR-SRS grouping information for those M NR-SRS resources can also be signaled. The configuration information can include: the indices of a set of M NR-SRS resources; and number of NR-SRS groups and the indices of NR-SRS resources in each group among those M NR-SRS resources.

In another embodiment, the NR-SRS grouping configuration information is sent along with the K NR-SRS resource configuration through the RRC signaling. Then the UE is requested to transmit a set of M≤K NR-SRS resources through the triggering indication in MAC-CE or L1 signaling. An indication of NR-SRS grouping can be signaled through MAC-CE or L1 signaling for those configured M NR-SRS resources. That indication would indicate the UE whether the NR-SRS grouping may be applied or not. For example, if the UE is indicated of that the NR-SRS grouping is on, the UE is requested to transmit the M NR-SRS resources with configured grouping information. For example, if the UE is indicated of the NR-SRS grouping is off, the UE is requested to transmit the M NR-SRS resources without grouping configuration.

In one example for semi-persistent NR-SRS transmission, the UE can be configured with K NR-SRS resources and the UE can be configured with the NR-SRS grouping information. In one example, the NR-SRS resource grouping information can be signaled in RRC message and an indication of NR-SRS grouping on/off is signaled in the activation message. If the indication in activation message indicates the NR-SRS grouping is on, the UE is requested to apply the configured NR-SRS grouping on the semi-persistent transmission. If the indication in activation message indicates the NR-SRS grouping is off, the UE is requested not to apply the configured NR-SRS grouping on the semi-persistent transmission.

In another example, the NR-SRS resource grouping information can be dynamically configured through MAC-CE and/or L1 signaling. The dynamic NR-SRS resource grouping information can be signaled as part of the activation message. Then the UE is requested to apply the dynamically configured grouping on the NR-SRS transmission.

In one embodiment for periodic NR-SRS transmission, the UE can be configured with K NR-SRS resources and also the NR-SRS grouping configuration. The UE is requested to transmit the K NR-SRS resources with configured grouping information until new grouping information is configured.

In one embodiment, one UE can be configured with K semi-persistent NR-SRS resources through RRC and a MAC-CE signaling can be used to activate the transmission of K semi-persistent NR-SRS resource transmission. In the activation signaling, one or more of the following information can be configured to the UE. In one example of the Tx beam sweeping pattern across K activated NR-SRS resource, 1-bit flag can be used to indicate the Tx beam sweeping pattern. In such example, the value of 1-bit field being 0 can indicate that the UE can apply different Tx beams to those NR-SRS transmission on those K NR-SRS resources and the value of 1-bit field being 1 can indicate that the UE may apply same Tx beam to those K NR-SRS resource. In another example of the Tx beam ID information, the TRP can indicate one or more SRI(s) in the MAC-CE activation message to the UE and the UE may determine the Tx beam(s) based on the signaled SRI. In one instance, the TRP can indicate one or more CRI(s) in the MAC-CE activation message to the UE and the UE may determine the Tx beams based on the UE Rx beams that correspond to the signaled CRI(s).

In one embodiment, a measurement window can be configured for NR-SRS transmission on activated semi-persistent NR-SRS resources. In one example, the activation message can also signal a length of measurement window (for example, number of slots $N_M$, for example the number of periodicity.) The first transmission of the semi-persistent NR-SRS can be configured as the starting position of first measurement window. Within one measurement window, the UE can be requested to keep the same Tx beam on all NR-SRS transmission on that NR-SRS resource. Between two measurement windows, the UE can change the Tx beam on NR-SRS transmission on that NR-SRS resource.

In some embodiments, a UE can be configured K aperiodic NR-SRS resources through RRC signaling. A MAC-CE signaling can be used to select and activate N NR-SRS resources out of those K configured NR-SRS resources. The MAC-CE signaling can also signal one or more SRIs (or CRIs) that the UE can be configured to use to determine the Tx beams for those N NR-SRS resources. A L1 signaling DCI can be used to trigger the transmission of those N NR-SRS resource selected/activated by a MAC-CE. In one example, the MAC-CE signaling can be used to select and activate and formulate one or more sets of aperiodic NR-SRS resources and each set can contain one or more NR-SRS resources out of K configured aperiodic NR-SRS resources.

Then in DCI, a few-bit field indicating the set index configured in MAC-CE signaling can trigger the transmission of NR-SRS resources configured in the indicated set. The DCI can also indicate the Tx beam sweeping pattern (Tx beam are swept or same Tx beam is applied) on those triggered NR-SRS resources. In one example, 1-bit field in DCI can be used to indicate the Tx beam sweeping pattern across those triggered NR-SRS resource. The value of 1-bit field being 0 can indicate that the UE may sweep Tx beams across those triggered NR-SRS resources and the value of 1-bit field being 1 can indicate that the UE may apply the same Tx beam on those triggered NR-SRS resources.

In some embodiments, a UE can be configured with P sets of NR-SRS resources through RRC signaling and each set can contain one or more configured aperiodic NR-SRS resource. A DCI or MAC-CE can be used to trigger the transmission of one set of aperiodic NR-SRS resources. The DCI or MAC-CE can signal the index of one NR-SRS resource set or the index of one RS setting configured by RRC. The DCI or MAC-CE can also indicate the Tx beam sweeping pattern (Tx beam are swept or same Tx beam is applied) on those triggered NR-SRS resources.

In one example, 1-bit field in DCI or MAC-CE can be used to indicate the Tx beam sweeping pattern across those triggered NR-SRS resource. The value of 1-bit field being 0 can indicate that the UE may sweep Tx beams across those triggered NR-SRS resources and the value of 1-bit field being 1 can indicate that the UE may apply the same Tx beam on those triggered NR-SRS resources. The DCI or MAC-CE can also signal one or more SRIs (or CRIs) that the UE can be request to use to determine the Tx beamformers for triggered aperiodic NR-SRS transmission.

In one embodiment, the UE can be configured with a time repetition for one NR-SRS resource. The UE can be configured with one or more of the following information: the number of time repetition for one NR-SRS resource, $N_R$. The example of $N_R$ can be 2, 4, and 8. The absence of $N_R$ in the configuration can indicate that there is no time repetition configured for that NR-SRS resource; the symbol offset between two adjacent repetitions of that NR-SRS resource; and/or the slot offset between two adjacent repetitions of that NR-SRS resource.

In one embodiment, the UE can be configured with a time repetition property for a set or group of NR-SRS resources. The UE can be configured with a group/set of NR-SRS resource and that group can contain one or multiple NR-SRS resources. The UE can be configured with (1) the number of time repetition (2) the symbol offset or slot offset between two adjacent repetitions for that group. The UE can be requested to apply the time repetition property when transmitting any one NR-SRS resources in that NR-SRS resource group/set.

In one embodiment, the UE can be configured with a time repetition property for periodic NR-SRS resource. The UE can be configured with (1) the number of time repetition $N_R$. (2) the symbol offset $\Delta_1$ or slot offset $\Delta_2$ between two adjacent repetitions for that periodic NR-SRS resource. The UE can be requested to transmit this NR-SRS resource periodically with periodicity $T_0$ and within each period, the UE can be requested to transmit this NR-SRS resource $N_R$ times with offset $\Delta_1$ or $\Delta_2$ between two adjacent transmissions.

In one embodiment, the UE can be configured with a time repetition property for semi-persistent NR-SRS resource. The UE can be configured with (1) the number of time repetition $N_R$. (2) the symbol offset $\Delta_1$ or slot offset $\Delta_2$ between two adjacent repetitions for that periodic NR-SRS resource. When the semi-persistent NR-SRS resource is activated, the UE can be requested to transmit this NR-SRS resource periodically with periodicity $T_0$ until NR-SRS resource is deactivated and within each period, the UE can be requested to transmit this NR-SRS resource $N_R$ times with offset $\Delta_1$ or $\Delta_2$ between two adjacent transmissions.

In one embodiment, the UE can be configured with a time repetition property for aperiodic NR-SRS resource. The UE can be configured with (1) the number of time repetition $N_R$. (2) the symbol offset $\Delta_1$ or slot offset $\Delta_2$ between two adjacent repetitions for that periodic NR-SRS resource. When the aperiodic NR-SRS resource is trigged, the UE can be requested to transmit this NR-SRS resource $N_R$ times with offset $\Delta_1$ or $\Delta_2$ between two adjacent transmissions.

In one embodiment, the UE can be configured with one or more of the following information for one NR-SRS resource: supporting of time repetition in the transmission of this NR-SRS resource. If this information or indication is configured, time repetition can be applied in the transmission of this NR-SRS resource; the symbol offset $\Delta_1$ or slot offset $\Delta_2$ between two adjacent repetitions; and/or number of repetition $N_R$.

The NR-SRS resource can be semi-persistent or aperiodic NR-SRS. The UE can be configured with one bit indicator in the activation signaling for a semi-persistent NR-SRS resource. That indicator can indicate whether time repetition may be applied in this activated semi-persistent transmission. If the indicator configures yes, the UE can be requested to transmit this NR-SRS resource periodically with periodicity $T_0$ and within each period, the UE can be requested to transmit this NR-SRS resource NR times with offset $\Delta_1$ or $\Delta_2$ between two adjacent transmissions. A number of repetitions, No, can be signaled in the activation message.

In one example a first bit field in the activation message can be used to indicate the following information: if the value of a first bit field is 0, the UE can be requested to not apply time repetition feature to the activated semi-persistent transmission; and if the value of a first bit field is other than 0, the UE can be requested to first calculate a number of repetition based on the value of a first bit field and then apply the time repetition with this calculated repetition number to the activated semi-persistent transmission.

A single activation message can be used to activate a group of semi-persistent NR-SRS resources. The aforementioned embodiments can be applied to that group of semi-persistent NR-SRS resources.

The UE can be configured with one bit indicator in the trigger signaling for an aperiodic NR-SRS resource. That indicator can indicate whether time repetition may be applied in this triggered transmission. If the indicator configures yes, the UE can be requested to transmit this NR-SRS resource NR times with offset $\Delta_1$ or $\Delta_2$ between two adjacent transmissions. A number of repetitions, No, can be signaled in the trigger message. In one example a first bit field in the trigger message can be used to indicate the following information: if the value of a first bit field is 0, the UE can be requested to not apply time repetition feature to the triggered transmission; if the value of a first bit field is other than 0, the UE can be requested to first calculate a number of repetition based on the value of a first bit field and then apply the time repetition with this calculated repetition number to the triggered transmission.

A single activation message can be used to trigger a group of aperiodic NR-SRS resources. The above embodiments can be applied to that group of aperiodic NR-SRS resources.

In some embodiments, a UE can be requested to calculate the Tx power for N NR-SRS resources based on UL beam management power control if the transmission of those N NR-SRS resources is for UL beam management. The purpose for this embodiment is to ensure same Tx power density (e.g., Tx power density can be defined as Tx power per Resource element of SRS signal, and can be defined as Tx power of SRS signal per physical resource block) or same total Tx power so that the NW can measure the channel quality of each Tx beam direction accurately without the impact of varying Tx power. The set of N NR-SRS resources can be the NR-SRS resource to carry a round of UE Tx beam sweeping. That set of N NR-SRS resources can be the NR-SRS resources to carry a round of same Tx beam to support gNB Rx beam sweeping.

In one embodiment, the UE can be requested to calculate the power for those N NR-SRS resources $\{S_1, S_2, \ldots S_N\}$ given by $P_{S_n} = \min\{P_{CMAX,C}, 10 \log(M_{SRS,S_n}) + P_{o,SRS} + \alpha_{SRS,C} \times PL + f_{SRS}\}$. Here, $P_{S_n}$ is the Tx power for the NR-SRS $S_n$, n=1, 2, ..., N. The UE can be requested to apply one same path loss measurement PL to calculate the Tx power for those N NR-SRS resources $\{(S_1, S_2, \ldots, S_N\}$. The PL can be measured from one the signal NR-SSS, NR-PSS, NR-PBCH or DMRS to NR-PBCH in one NR-SS block. The NW can configure the UE with a NR-SS block index to measure the path loss to calculate the Tx power of NR-SRS for beam management. The NW can configure the UE with a CSI-RS for the UE to measure the path loss PL to calculate the Tx power for NR-SRS when the NR-SRS is transmitted for beam management. $M_{SRS,S_n}$ is the bandwidth of NR-SRS resource $S_n$, n=1, 2, ..., N. $P_{CMAX,C}$ can be the configured UE transmit power for NR-SRS for UL beam management. $P_{o,SRS}$ and $\alpha_{SRS,C}$ can be power control parameter configured by high layer signaling. $f_{SRS}$ is the SRS power adjustment for UL beam management.

In some embodiments, the UE can be requested to calculate the power for those N NR-SRS resources given by: $P_0 = \min\{P_{CMAX,C}, 10 \log(M_{SRS,0}) + P_{o,SRS} + \alpha_{SRS,C} \times PL + f_{SRS}\}$ $P_{S_n} = P_0, \forall n=1, 2, ... n$. where $P_{S_n}$ is the Tx power for the NR-SRS $S_n$, n=1, 2, ..., N.

The UE can be requested to apply one same path loss measurement PL to calculate the Tx power for those N NR-SRS resources $\{S_1, S_2, ..., S_N\}$. The PL can be measured from one the signal NR-SSS, NR-PSS, NR-PBCH or DMRS to NR-PBCH in one NR-SS block. The NW can configure the UE with a NR-SS block index to measure the path loss to calculate the Tx power of NR-SRS for beam management. The NW can configure the UE with a CSI-RS for the UE to measure the path loss PL to calculate the Tx power for NR-SRS when the NR-SRS is transmitted for beam management. $M_{SRS,S_n}$ is the bandwidth of NR-SRS resource $S_n$, n=1, 2, ..., N. $P_{CMAX,C}$ can be the configured UE transmit power for NR-SRS for UL beam management. $P_{o,SRS}$ and $\alpha_{SRS,C}$ can be power control parameter configured by high layer signaling. $f_{SRS}$ is the SRS power adjustment for UL beam management.

In the aforementioned equation, $M_{SRS,0}$ can be calculated by one of the following option:

$$M_{SRS,0} = \max_{n=1,2,...,N}\{M_{SRS,n}\}; M_{SRS,0} = \min_{n=1,2,...,N}\{M_{SRS,n}\};$$

$$M_{SRS,0} = \operatorname*{mean}_{n=1,2,...,N}\{M_{SRS,n}\}; M_{SRS,0} = \left\lfloor \frac{1}{N}\sum_{n=1}^{N} M_{SRS,n} \right\rfloor; \text{ or}$$

$$M_{SRS,0} = \left\lceil \frac{1}{N}\sum_{n=1}^{N} M_{SRS,n} \right\rceil.$$

In some embodiments, the UE can be requested to calculate the Tx power for those N NR-SRS resource as following steps. In step 1, $P_{S_n} = 10 \log(M_{SRS,S_n}) + P_{o,SRS} + \alpha_{SRC,C} \times PL + f_{SRS}, \forall n=1, 2, ..., N$.

The UE can be requested to apply one same path loss measurement PL to calculate the Tx power for those N NR-SRS resources $\{S_1, S_2, ..., S_N\}$. The PL can be measured from one the signal NR-SSS, NR-PSS, NR-PBCH or DMRS to NR-PBCH in one NR-SS block. The NW can configure the UE with a NR-SS block index to measure the path loss to calculate the Tx power of NR-SRS for beam management. The NW can configure the UE with a CSI-RS for the UE to measure the path loss PL to calculate the Tx power for NR-SRS when the NR-SRS is transmitted for beam management. $M_{SRS,S_n}$ is the bandwidth of NR-SRS resource $S_n$, n=1, 2, ..., N. $P_{CMAX,C}$ can be the configured UE transmit power for NR-SRS for UL beam management. $P_{o,SRS}$ and $\alpha_{SRS,C}$ can be power control parameter configured by high layer signaling. $f_{SRS}$ is the SRS power adjustment for UL beam management.

In step 2, the UE can be requested to calculate $$P_{max} = \max_{n=1,2,...,N} P_{S_n}. \text{ If } P_{max} > P_{CMAX,C},$$

then calculate $\Delta_p = P_{max} - P_{CMAX,C}$ and go to step 3. If $P_{max} < P_{CMAX,C}$, skip step 3 and go to step 4. Step 3: The UE can be requested to calculate $P_{S_n} = P_{S_n} - \Delta_p, \forall n=1, 2, ..., N$. Then go to step 4. Step 4: The UE apply Tx power $P_{S_n}$ to NR-SRS resource $S_n$, n=1, 2, ..., N.

In some embodiments, the NW can indicate a UE that the transmission of NR-SRS is for UL beam management and the UE may calculate the Tx beam power based on the method for UL beam management.

In some embodiments, the UE can be configured with one or more than on groups of SRS resources and the UE can configure one or more of the followings for each of SRS resource group. In one example, whether UL beam management power control may be applied on those SRS resources contain in that SRS resource group. If yes, the UE can be requested to apply the same Tx power on SRS resources contained in that SRS resource group and the UE can be requested to calculate the Tx power for those SRS resources according the methods described in this disclosure. In another example, the signal that the UE may use to derive the path loss for UL power control of those SRS resources contained in that SRS resource group. In yet another example, whether the UE may keep one same Tx beams on those SRS resources contained in that SRS resource group. In yet another example, the Tx beam ID information for the UE to derive the Tx beam(s) that the UE may apply to the transmission of those SRS resources.

With the above configured information, the UE can be request to calculate the Tx beam(s), Tx power for those SRS resources and then apply the calculated results on the transmission of those SRS resources.

Those parameters can be configured/signaled in high layer signaling (e.g., RRC), MAC-CE and/or physical layer signaling (e.g., DCI). Those parameters can be signaled and configured jointly. Those parameters can be signaled with a combination of high layer signaling, MAC-CE and/or physical layer signaling (e.g., DCI).

In one embodiment, the UE can be configured with a SRS resource group and N SRS resources can be configured in this group. The UE can be configured with 1-bit information element for this SRS resource group. The presence of this 1-bit information element in the configuration can indicate that the UE may apply some beam sweeping operation on those SRS resources in that group and the value of this 1-bit information element can indicate the beam sweeping operation. When this 1-bit information element is present, the UE can be configured to apply the UL power control for UL beam management on those SRS resources contained in that group. An example is given in TABLE 1.

TABLE 1

| | Bit information element |
|---|---|
| The value of 1-bit information element | The configuration |
| absent | The UE is not request to apply Tx beam sweeping or same Tx beams on those SRS resources contained in this group. The UE may apply normal power control on each of those SRS resources in this group |

TABLE 1-continued

| The value of 1-bit information element | The configuration |
|---|---|
| 0 | The UE can be requested to apply UL power control for UL beam management on the SRS resources contained in that group and the UE can be requested to calculate the Tx power for those SRS resources contained in that group according to the methods described in this disclosure. The UE can be requested to apply different Tx beams on different SRS resources contained this group. |
| 1 | The UE can be requested to apply UL power control for UL beam management on the SRS resources contained in that group and the UE can be requested to calculate the Tx power for those SRS resources contained in that group according to the methods described in this disclosure. The UE can be requested to apply one same Tx beams on different SRS resources contained in this group. The UE can be requested to keep one same Tx beam on different SRS resources contained in this group |

In one embodiment, the UE can be configured with a SRS resource group and N SRS resources can be configured in this group. The UE can be configured with 2-bit information element for this SRS resource group. The value of this 2-bit information element can indicate the following information as the following TABLE 2.

TABLE 2

| The value of 2-bit information element | The configuration |
|---|---|
| 00 | The UE is not request to apply Tx beam sweeping or same Tx beams on those SRS resources contained in this group. The UE may apply normal power control on each of those SRS resources in this group |
| 01 | The UE can be requested to apply UL power control for UL beam management on the SRS resources contained in that group and the UE can be requested to calculate the Tx power for those SRS resources contained in that group according to the methods described in this disclosure. The UE can be requested to apply different Tx beams on different SRS resources contained this group. |
| 10 | The UE can be requested to apply UL power control for UL beam management on the SRS resources contained in that group and the UE can be requested to calculate the Tx power for those SRS resources contained in that group according to the methods described in this disclosure. The UE can be requested to apply one same Tx beams on different SRS resources contained in this group. The UE can be requested to keep one same Tx beam on different SRS resources contained in this group |

In one embodiment, the UE can be configured with 1-bit information element through high layer signaling (e.g., RRC) to indicate whether the UE may apply UL power control for UL beam management on those SRS resources contained in one group as shown in TABLE 3.

TABLE 3

| The value of 1-bit information element | The configuration |
|---|---|
| 0 | The UE may apply normal power control on each of those SRS resources in this group |
| 1 | The UE can be requested to apply UL power control for UL beam management on the SRS resources contained in that group and the UE can be requested to calculate the Tx power for those SRS resources contained in that group according to the methods described in this disclosure. |

When the value of 1-bit information element is 1, the UE can be configured with a second information element in MAC-CE or DCI to configure the beam sweeping operation across those SRS resources contained in one group. The UE can be configured with beam ID information for the transmission of N SRS resources in one given group. The beam ID information can be the index of one SRS resource. The beam ID information can be the index of one CSI-RS resource. The beam ID information can be the index of one SS block. The beam ID information can be a Transmission configuration indication (TCI) state. The UE can be request to calculate the Tx beam for N SRS resources in one given group by one or more of the following methods.

In one example, if the UE is configured/requested to keep the same Tx beam on N SRS resources in one group and if the index of one SRS resource, i, is configured, the UE can be requested to apply the Tx beam that was applied on SRS resource i to all those N SRS resources in one group. If the index of one CSI-RS resource or one SS block is signaled, the UE can be requested to calculate one Tx beam based on the Rx beam that is spatial QCLed to the configured CSI-RS resource or SS block and then the UE can be requested to apply the calculated Tx beam to all those N SRS resources. If the UE is configured with a TCI state, the UE can be requested to calculate one Tx beam based on the Rx beam that is indicated by the spatial QCL information in the configured TCI state and then apply the calculated Tx beam to all those N SRS resources.

In one example, if the UE is configured/requested to not keep the same Tx beam but to apply different Tx beams on N SRS resources in one group, the UE can be requested to first calculate one Tx beam based on the configured beam ID information and then can formulate up to N different Tx beams based on the calculated Tx beam. In one example, those N different Tx beam can be the beamforming direction that is similar to the calculated Tx beam. In another example, those N different Tx beams can be the beamforming direction that is narrower than the calculated Tx beam. If the index of one SRS resource, i, is configured, the UE can be requested to obtain the calculated Tx beam that was applied on SRS resource i. If the index of one CSI-RS resource or one SS block is signaled, the UE can be requested to calculate one Tx beam based on the Rx beam that is spatial QCLed to the configured CSI-RS resource or SS block and then the UE can be requested to use that calculated Tx beam to calculate up to N different Tx beams that are applied to those N SRS resources. If the UE is configured with a TCI state, the UE can be requested to calculate one Tx beam based on the Rx beam that is indicated by the spatial QCL information in the configured TCI state and then use that calculated Tx beam to calculate up to N different Tx beam that are applied those N SRS resources.

The beam ID information can be signaled through high layer signaling (e.g., RRC) for one SRS resource group, can be signaled through MAC-CE, and can be signaled through physical layer signaling (e.g., DCI). In one example, the beam ID information can be configured through RRC for semi-persistent SRS resources. In one example, the beam ID information can be configured through MAC-CE for semi-persistent SRS resources. In one example, the beam ID information can be configured through RRC for aperiodic SRS resources. In one example, the beam ID information can be configured through MAC-CE for aperiodic SRS resources. In one example the beam ID information can be signaled through DCI for aperiodic SRS resources.

In one embodiment, the UE can be configured with N1 periodic NR-SRS transmission for UL beam management. Those N1 periodic NR-SRS can have same or different periodicity in terms of number of slots. In one example, UE tx beam sweeping is configured on those N1 periodic NR-SRS resources and the UE can be requested to apply different Tx beamformers on the NR-SRS transmission of those N1 NR-SRS resources. The UE can be configured to calculate the Tx power for the transmission of those N1 NR-SRS resources based one of the above proposed methods. The pathloss PL the UE uses in Tx power calculation in above methods can vary along time because generally the UE would measure one downlink signal (e.g., NR-SSS in one NR-SS block, e.g., one CS-RS resource) continually to track the channel variation.

The UE can be configured with a slot window and within each slot window, the UE can be requested to use a same PL value to calculate the Tx power for the transmission of all N1 NR-SRS resources. In one example, the UE can be configured with a slot offset to and a slot window length T slots. Then the slots t0~t0+T−1 is defined as one slot window, the slots t0+T~t0+2×T−1 is defined as one slot window, the slots t0+n×T~t0+(n+1)×T−1, n=0, 1, 2, 3, 4, . . . is defined as one slot window. Within each slot window, the UE can be requested to keep the same value for PL in the calculation of Tx power for any transmission of N1 NR-SRS resources within the slot window.

In one embodiment, the UE can be configured with one piece of state information in the activation message of NR-SRS transmission of N2 semi-persistent NR-SRS resources. The state information can indicate of the UE that the activated semi-persistent NR-SRS transmission is for UL beam management and the UE may use one of the above methods to calculate the Tx power. The pathloss PL the UE uses in Tx power calculation in above methods can vary along time because generally the UE would measure one downlink signal (e.g., NR-SSS in one NR-SS block, e.g., one CS-RS resource) continually to track the channel variation. The UE can be configured with a slot window and within each slot window, the UE can be requested to use a same PL value to calculate the Tx power for the transmission of all N2 NR-SRS resources. In one example, the UE can be configured with a slot offset to and a slot window length T slots. Then the slots t0–t0+T−1 is defined as one slot window, the slots t0+T–t0+2×T−1 is defined as one slot window, the slots t0+n×T–t0+(n+1)×T−1, n=0, 1, 2, 3, 4, . . . is defined as one slot window. Within each slot window, the UE can be requested to keep the same value for PL in the calculation of Tx power for any transmission of N2 NR-SRS resources within the slot window.

In one embodiment, the UE can be requested to transmit N3 aperiodic NR-SRS transmission for UL beam management and beam sweeping operation can be applied over the transmission of those N3 NR-SRS resources. The UE can be configured with one state information in the aperiodic NR-SRS transmission trigger signaling to indicate that the triggered aperiodic NR-SRS transmission is for UL beam management and the UE can be requested to calculate the Tx power based on one the above methods configured for UL beam management.

In some embodiments, a UE can be configured with a set of SRS resources with N1≥1 SRS resources. An indicator can be configured or indicated for this set of SRS resources to indicate the Tx beam repetition across those N1 SRS resources. In one example, an indicator can take the values of "on/off." If the value of indicator is "on," the UE can be requested to apply one same Tx beam on those N SRS resources in that set. If the value of indicator is "Off," the UE can be requested to apply different Tx beams on those N SRS resources in that set. In one example, an indicator can be present or absent. If the indicator is present, the UE can be requested to apply one same Tx beam on those N SRS resources in that set. If the value of indicator is absent, the UE can be requested to apply different Tx beams on those N SRS resources in that that.

In some embodiments, a UE can be configured or indicated with an SRI, CRI or SSBI for a set of SRS resources with N1≥1 SRS resources. The UE can be requested to calculate the Tx beam(s) for the transmission of those N1 SRS resources within that set based on the configured/indicated SRI, CRI or SSBI.

In one embodiment, a UE can be configured with a set of N1 SRS resources. An indicator for Tx beam repetition with value being "On" (or being present) is configured or indicated for this set of SRS resources and a first SRI (or CRI, SSBI) is configured or indicated for this set of SRS resources. The UE can be requested to obtain one Tx beam based on the configured/indicated a first SRI (CRI or SSBI), and then, the UE can be requested to apply and repeat that obtained Tx beam on those N1 SRS resources.

In one embodiment, a UE can be configured with a set of N1 SRS resources. An indicator for Tx beam repetition with value being "Off" (or being absent) is configured or indicated for this set of SRS resources and a first SRI (or CRI, SSBI) is configured or indicated for this set of SRS resources. The UE can be requested to calculate N1 different Tx beams based on the configured/indicated a first SRI (CRI or SSBI), and then, the UE can be requested to apply those different Tx beams on those N1 SRS resources and apply different Tx beams on different SRS resources within that set.

In one embodiment, a UE can be configured with a set of aperiodic N1 SRS resources. An indicator for Tx beam repetition with value being "On" (or being present) is configured by high-layer signaling (RRC or MAC-CE) or indicated in the triggering DCI for this set of SRS resources. And a first SRI (or CRI, SSBI) can be configured by high-layer signaling (RRC or MAC-CE) or indicated in the triggering DCI for this set of SRS resources. The UE can be requested to obtain one Tx beam based on the configured/indicated a first SRI (CRI or SSBI), and then, the UE can be requested to apply and repeat that obtained Tx beam on those N1 SRS resources. In one method, a UE can be configured with a set of N1 aperiodic SRS resources. An indicator for Tx beam repetition with value being "Off" (or being absent) can be configured by high layer signaling (RRC or MAC-CE) or indicated in the triggering DCI for this set of SRS resources and a first SRI (or CRI, SSBI) can be configured by high layer signaling (RRC or MAC-CE) or indicated in the triggering DCI for this set of SRS resources. The UE can be requested to calculate N1 different Tx beams based on the configured/indicated a first SRI (CRI or SSBI), and then, the UE can be requested to apply those different Tx beams on those N1 SRS resources and apply different Tx beams on different aperiodic SRS resources within that set.

In one embodiment, a UE can be configured with a set of semi-persistent N1 SRS resources. An indicator for Tx beam repetition with value being "On" (or being present) is configured by high-layer signaling (RR) or indicated in the activation message for this set of SRS resources. And a first SRI (or CRI, SSBI) can be configured by high-layer signaling (RRC) or indicated in the activation message for this set of SRS resources. The UE can be requested to obtain one Tx beam based on the configured/indicated a first SRI (CRI or SSBI), and then, the UE can be requested to apply and repeat that obtained Tx beam on those N1 SRS resources.

In one embodiment, a UE can be configured with a set of N1 semi-persistent SRS resources. An indicator for Tx beam repetition with value being "Off" (or being absent) can be configured by high layer signaling (RRC) or indicated in the activation message for this set of SRS resources and a first SRI (or CRI, SSBI) can be configured by high layer signaling (RRC) or indicated in the activation message for this set of SRS resources. The UE can be requested to calculate N1 different Tx beams based on the configured/indicated a first SRI (CRI or SSBI), and then, the UE can be requested to apply those different Tx beams on those N1 semi-persistent SRS resources and apply different Tx beams on different semi-persistent SRS resources within that set.

In one embodiment, a UE can be requested to report the information related with a number of UL transmit beams that may be needed for beam sweeping operation for UL beam management.

In one example, the UE can be requested to report one or more of the following information: number of Tx beams that the UE need to transmit during UL Tx beam sweeping for UL beam management; maximal number of Tx beam that the UE would transmit during UL Tx beam sweeping for UL beam management; minimal number of Tx beams that the UE would transmit during UL Tx beam sweeping for UL beam management; number of Tx beams that the UE needs to transmit during one round of UL Tx beam sweeping operation for UL beam management; number of Tx beams that the UE needs to transmit during one particular round of Tx UL beam sweeping operation for UL beam management; number of Tx beams that the UE needs to transmit during a first round of Tx UL beam sweeping operation and number of Tx beams that the UE needs to transmit during a second round of Tx UL beam sweeping operation. A second round of Tx UL beam sweeping can be the refinement procedure for a first round; the UE can be requested to report two numbers. A first number is the number of Tx beam directions that the UE needs to cover all the possible area. A second number is the number of Tx beam directions that the UE needs use to refine one particular Tx beamforming directions; and the UE can be requested to report two numbers. A first number is the number of Tx beam directions that the UE needs during one round of beam sweeping for procedure U-1. A second number is the number of Tx beam directions that the UE needs to use during one round of beam sweeping for procedure U-3.

In another example, the UE can be requested to report one or more of the following information: number of different NR-SRS resources that the UE needs for UL Tx beam sweeping. The UE can apply different Tx beams on different NR-SRS resources; maximal number different NR-SRS resource that the UE requires for UL Tx beam sweeping; minimal number of different NR-SRS resources that the UE requires for UL Tx beam sweeping; number of time repetition of one CSI-RS resources that the UE requires UE beam training in case of beam correspondence; maximal number of time repetition of one CSI-RS resources that the UE requires UE beam training in case of beam correspondence; minimal number of time repetition of one CSI-RS resources that the UE requires UE beam training in case of beam correspondence; number of different NR-SRS resources that the UE requires for one round of UL Tx beam sweeping for UL beam management; number of different NR-SRS resources that the UE requires for one particular round of UL Tx beam sweeping for UL beam management; the UE can be requested to report two numbers of different NR-SRS resources: a first number of NR-SRS resources and a second number of NR-SRS resources. A first number of NR-SRS resources is the number of NR-SRS resources that the UE requires for the UL beam management procedure U-1. A second number of NR-SRS resources is the number of NR-SRS resources that the UE requires for the UL beam management procedure U-3; the UE can be requested to report a first number of NR-SRS resources and a second number of NR-SRS resources. A first number of NR-SRS resources is the number of NR-SRS resources that the UE needs for beam sweeping with all the UL Tx beam directions to cover all the direction the UE would train. A second number of NR-SRS resources is the number of NR-SRS resources that the UE requires for beam sweeping for the beam direction refinement for one particular direction; the UE can be requested to report two numbers: a first number and a second number. A first number is the number of different NR-SRS resources that the UE requires for the UL Tx beam sweeping for UL beam management. A second number is the number of time repetition of one CSI-RS resource that the UE requires for UE Tx/Rx beam train and sweeping in the case of beam correspondence; the UE can be requested to report maximal number of NR-SRS resources in one NR-SRS resource group/set that the UE requires; the UE can be requested to report minimal number of NR-SRS resources in one NR-SRS resource group/set for UL beam management which the UE requires; the UE can be requested to report the number of NR-SRS resources in one NR-SRS resource group/set configured by the TRP, which the UE requires; the UE can be requested to report a first number and a second number. A first number is the number of NR-SRS in one NR-SRS resource group/set for UL beam management configured by the TRP which the UE requires. A second number is the number of NR-SRS in one NR-SRS resource group/set for UL beam management configured by the TRP which the UE requires.

In one embodiment, one UE can signal one bit information to the NW and the value of that bit can indicate whether the UE needs to train (or align, or select) UL Tx beamformer. The value of that bit can indicate whether the UE has more than one UL Tx beamformers. The value if that bit can indicate whether the UE needs UL beam management procedure. The value of that bit can indicate one or more of the following information: whether the UE needs U-1 UL beam management procedure; whether the UE needs U-3 UL beam management procedure; whether the UE needs both U-1 and U-3 beam management procedures; and/or whether the UE needs either U-1 or U-3 beam management procedure.

In yet another example, one UE can be requested to report one or more of the following information. In one instance, the UE can be requested to report the number of UE transmit antenna panels and the UE can transmit UL signals simultaneously over those antenna panels. In one instance, the UE can be requested to report the number of UE transmit antenna panels. The UE would to train the Tx beam for each of those transmit antenna panels individually during UL beam management and the UE would select Tx beams from each of those transmit antenna panels for UL signal transmission. In one instance, the number of UE Tx beams that the UE would train/align during UL beam management for one transmit antenna panel. In one instance, the number of the UEs reports the number of UE transmit antenna panels. The UE would to train the Tx beam for each of those transmit antenna panels individually during UL beam management and the UE would select Tx beams from each of those transmit antenna panels for UL signal transmission. For each of those reported transmit antenna panels, the UE can report the number of Tx beams that the UE would train during UL beam alignment and the UE would select one Tx beam from them for UL signal transmission.

In one instance, the UE reports the number of UE transmit antenna panels. The UE would to train the Tx beam for each of those transmit antenna panels individually during UL beam management and the UE would select Tx beams from each of those transmit antenna panels for UL signal transmission; The UE can report a second number of Tx beams N2. The UE would train at most (or at least) N2 Tx beam during UL beam alignment and the UE would select one Tx beam from them for UL signal transmission for each reported transmit antenna panel.

In one instance, the number of UE transmit antenna panels that the UE can transmit through them simultaneously and the number of Tx beams that the UE wishes to train for each of these panels. In one instance, the number of UE transmit antenna panels that the UE can transmit UL signals through them simultaneously and the maximal number of Tx beams that the UE would train/align on each of those panels.

In some embodiments, one UE can be requested to report one or more of the following information at least for UL beam management. In one example, the UE can report the number of NR-SRS resources that the UE is able to transmit simultaneously on one same OFDM/DFT-S-OFDM symbol. In one example, the UE can report the number of NR-SRS UL beam management processes. One UL beam management process can correspond to the UL beam sweeping from one UE transmit antenna panel. In one example, the UE can report the number of required NR-SRS resource groups/sets and the required number of NR-SRS resources for each of those NR-SRS resource group/set. The UE can or is able to transmit any different NR-SRS resources selected from different NR-SRS resource groups/sets simultaneously on a same OFDM or DFT-s-OFDM symbol. In one example, the UE can report the maximal number of NR-SRS resource groups/sets for the TRP to configure for UL beam management. The UE can or is able to transmit any different NR-SRS resources selected from different NR-SRS resource groups/sets of those groups/sets simultaneously on a same OFDM or DFT-s-OFDM symbol. The UE can report a second number of NR-SRS resources, which is the maximal number of NR-SRS resource that the TRP can configure in each of those NR-SRS resource groups/sets. The UE can report a third number of NR-SRS resources, which is the minimal number of NR-SRS resource that the TRP can or may configure for each of those NR-SRS resource groups/sets.

In one embodiment, one UE can be configured with NR-SRS resources that may be transmitted from different UE transmit antenna panels. The use case for that is to allow the UE with multiple antenna panels to transmit reference signal for UL beam management for each individual transmit antenna panel or array.

In one embodiment, one UE can be configured with two NR-SRS groups (or sets). One or more than one NR-SRS resources can be configured in each of these two groups. The UE can be configured with one indicator, indicator A, for these two NR-SRS groups, which indicates the TRP would select one NR-SRS resource from each of these two group and the UE would be requested to use one or both of those two selected NR-SRS resources for some UL data transmission. In one example, the UE can be configured with one indicator for these two NR-SRS groups, which indicates that the Tx beams applied to any two different NR-SRS resources, one picked from one of these two NR-SRS resource groups and another picked from the other one of these two NR-SRS resource groups would be potentially used by that UE simultaneously on one same OFDM or DFT-s-OFDM symbol.

In one embodiment, one UE can be configured with N>1 NR-SRS groups (or sets). One or more than one NR-SRS resources can be configured in each of these N>1 groups. The UE can be configured with one indicator, indicator A, for these N>1 NR-SRS groups, which indicates the TRP would select one NR-SRS resource from each of these N>1 group and the UE would be requested to use one or both of those N>1 selected NR-SRS resources for some UL data transmission. In one example, the UE can be configured with one indicator for these N>1 NR-SRS groups, which indicates that the Tx beams applied to any N>1 different NR-SRS resources which are picked from these N>1 NR-SRS resource groups would be potentially used by that UE simultaneously on one same OFDM or DFT-s-OFDM symbol.

In one embodiment, the UE can be indicated with N>1 NR-SRS resource indices for UL signal transmission. In one example, the UE can be configured with multiple NR-SRS resource indices (SRIs) and those NR-SRS resource indices may be picked from different NR-SRS resource groups which are configured with indicator A. In one example, if the UE is configured with multiple SRIs but those indicated NR-SRS resource indices are not from different NR-SRS resource groups, the UE can be requested to only pick the subset of indicated NR-SRS resource indices that are from different NR-SRS resource groups. In one example, if the UE is configured with multiple SRIs that are not picked from NR-SRS resource groups that are configured with indicator A, the UE can be requested to only pick the subset of indicated NR-SRS resource indices that are from different NR-SRS resource groups that are configured with indicator A.

In one embodiment, a UE can be configured with one or more than one UL beam management process. The TRP can configure one NR-SRS resource with a UL beam management process ID number. The TRP can configure one NR-SRS resource group with a UL beam management process ID number.

In one embodiment, a UE can be configured with two NR-SRS groups: a first group and a second group. One or multiple NR-SRS resources can be configured in a first group. One or multiple NR-SRS resources can be configured in a second group. The TRP can configure a first UL beam management process ID number for a first group. The TRP can configure a second UL beam management process ID number for a second group. If a first UL beam management process ID and a second UL beam management ID number are different, the UE can be requested to assume that any one Tx beam the UE uses to transmit NR-SRS resources in a first UL beam management process ID number and any one Tx beam the UE uses to transmit NR-SRS resources in a second UL beam management process ID number can be transmitted by the UE simultaneously on a same OFDM or DFT-s-OFDM symbol.

The "UL beam management process ID number" can be called as an UL beam management ID, an UL beam management procedure number, an UL beam management process ID, an UL beam management sub-process ID (or index), the process ID, the UL beam sweeping process. The name "UL beam management process ID number" is exemplary and can be substituted with other names and labels without changing the substance of the aforementioned embodiment.

In one embodiment, a UE can be configured with N>1 NR-SRS groups. One or multiple NR-SRS resources can be configured in each of those N>1 groups. The TRP can configure a UL beam management process ID number for each of those groups. For any two of those N>1 groups with different UL beam management process ID numbers, the UE can be requested to assume that any one Tx beam the UE uses to transmit NR-SRS resources in one of these two groups and any one Tx beam the UE uses to transmit NR-SRS resources in another of these two groups can be transmitted by the UE simultaneously on a same OFDM or DFT-s-OFDM symbol.

Figure 13:
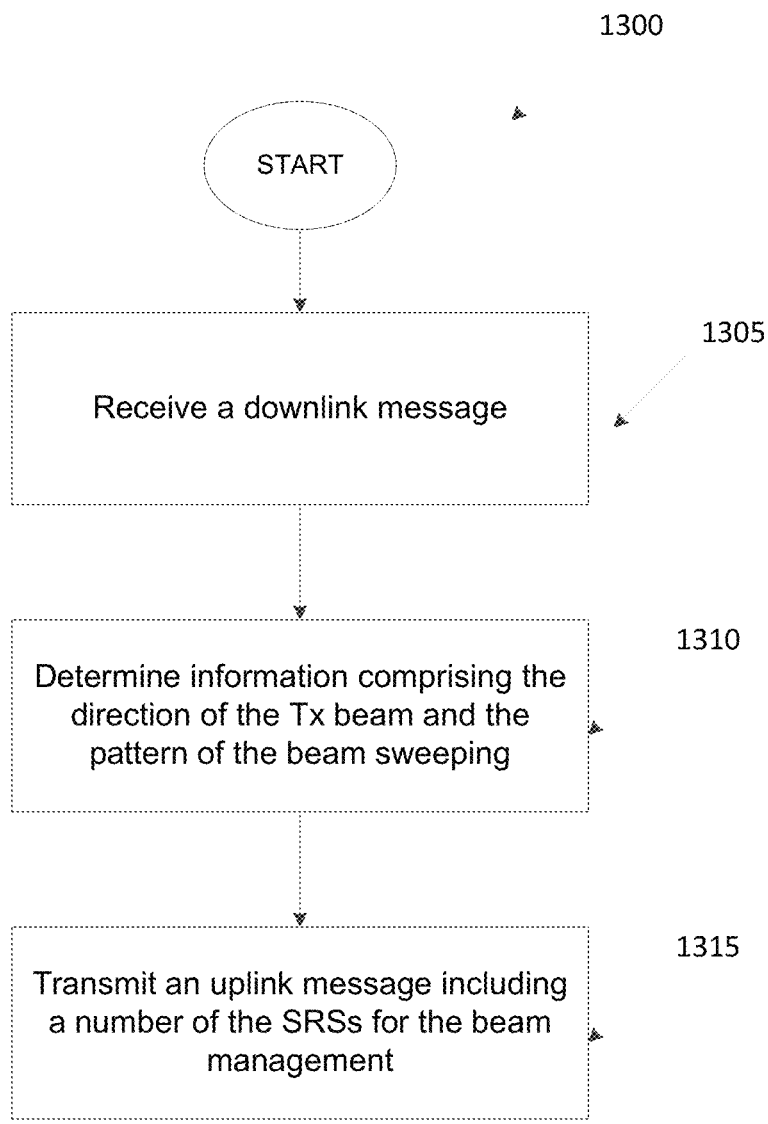
FIG. 13 illustrates a flow chart of a method for NR-SRS transmission procedure according to embodiments of the present disclosure.

FIG. 13 illustrates a flow chart of a method 1300 for NR-SRS transmission procedure, as may be performed by a user equipment (UE), according to embodiments of the present disclosure. An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 13, the method 1300 starts at step 1305. In step 1305, the UE receives, from a base station (BS), a downlink message comprising configuration information that includes a direction of transmit (Tx) beam and a pattern of the beam sweeping of a set of Tx beams for sounding reference signals (SRSs). In some embodiments, each of the set of Tx beams comprises either the pattern of the beam sweeping with multiple different Tx beam directions or the pattern of beam sweeping with a same Tx beam direction.

Subsequently, the UE in step 1310 determines information comprising the direction of the Tx beam and the pattern of the beam sweeping of the set of Tx beams. In some embodiment, the UE in step 1310 determines SRS resources in a set of SRS resources associated with the direction of the Tx beam and the pattern of the beam sweeping of the set of Tx beams. In such embodiments, each SRS resource in the set of SRS resources comprises a Tx power with a same transmit power level for an uplink beam management. In such embodiments, the Tx power is calculated for each SRS in the set of SRS resources as given by $P_{S_n} = \min\{P_{CMAX,C}, 10 \log(M_{SRS,S_n}) + P_{o,SRS} + \alpha_{SRS,C} \times PL + f_{SRS}\}$ where $P_{CMAX,C}$ is a maximal UE transmit power, $M_{SRS,S_n}$ is an SRS bandwidth of the SRS resource, $P_{o,SRS}$ is configured for the set of SRS resources, $\alpha_{SRS,C}$ is configured for the set of SRS resources, a PL is a downlink path loss calculated for the set of SRS resources, and a $f_{SRS}$ is a carrier frequency of each SRS.

Finally, the UE in step 1315 transmits, to the BS, an uplink message including a number of the SRSs for the beam management with the set of Tx beams in accordance with the configuration information. In some embodiments, the UE in step 1315 transmits, to the BS, a transmission of a number of SRS resources for the beam management. In such embodiments, the transmission of the number of SRS resources is performed at a same Tx power level.

In some embodiments, a "Tx beam mode" is defined as a set UE transmit analog beams. In other word, it is defined as UE transmission operation using a set of UE transmit analog beams, including the special case of one transmit analog beam. The "Tx beam mode" can be called Tx mode, transmit mode, transmit beam mode, Tx mode for beam management, an Tx beam, an Tx beam ID, transmit pattern, transmit beam pattern, Tx beam combination, Tx beam group, Tx beam set, Tx beam subset, Tx beam selection, Tx beam port, Tx antenna port. The name "Tx beam mode" is exemplary and can be substituted with other names and labels without changing the substance of this embodiment.

A Tx beam mode can be the selection of subset of analog beams from different UE's transmit antenna panels. Those analog beams in one Tx beam mode can be used by the UE for uplink transmission simultaneously because they are on different antenna panels or arrays. If the UE only has one Tx antenna panel, one Tx beam mode would be just one analog beam. If the UE has two Tx antenna panels, one Tx beam mode can be the selection of two analog beams and one analog beam from each Tx antenna panels. One Tx beam mode can be called one Tx beam. In NR-SRS transmission, the UE can apply one Tx beam mode on one NR-SRS resource and one Tx beam mode can correspond to one resource index.

The definition and mechanism of Tx beam mode is useful for UE transmit operation based on hybrid beamforming. The UE with hybrid beamforming can formulate one or more analog beams on each transmit antenna panel and those beams can point to different directions. The gNB and the UE need to select one from those beams for the best link quality between the gNB and the UE. The uplink transmission between the gNB and the UE, including for example, the uplink control channel PUCCH, the uplink data channel PUSCH is transmitted by some UE's transmission mechanism with those selected Tx beams. Changing the beam selection would change the UE transmission and also the link quality of uplink channel. An example of Tx beam mode is illustrated in FIG. 14.

Figure 14:
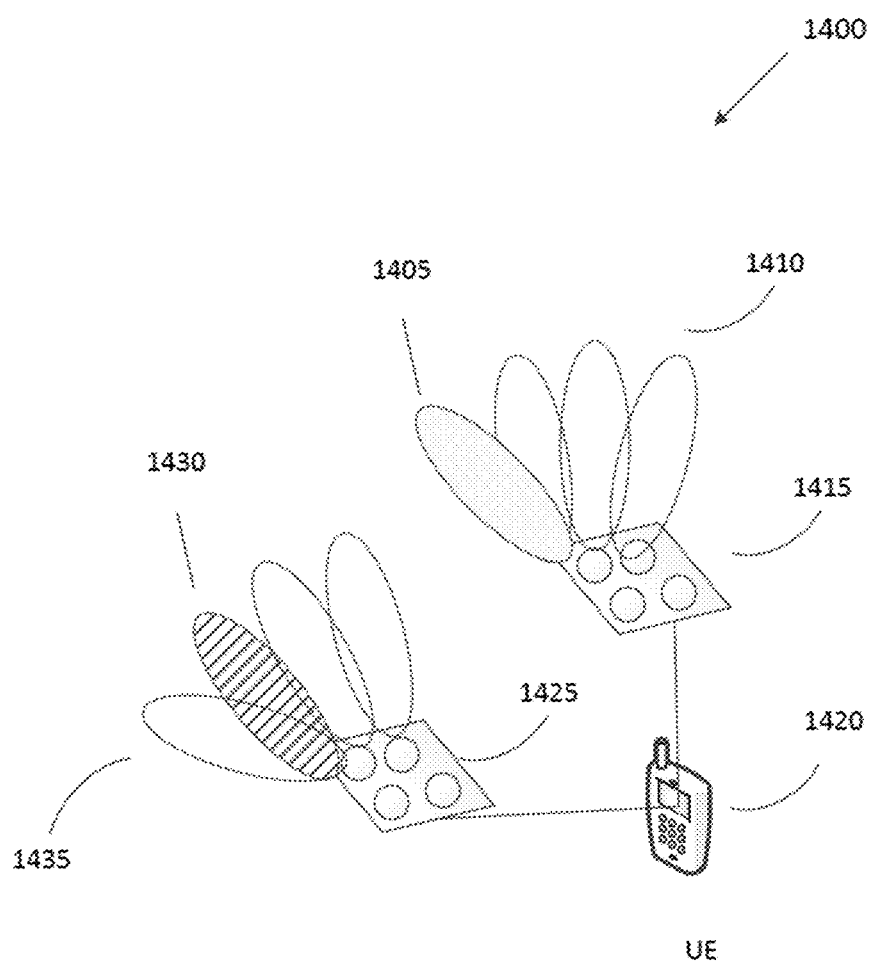
FIG. 14 illustrates an example antenna beam configuration according to embodiments of the present disclosure.

FIG. 14 illustrates an example antenna beam configuration 1400 according to embodiments of the present disclosure. An embodiment of the antenna beam configuration 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions. Other embodiments are used without departing from the scope of the present disclosure.

As shown in FIG. 14, a UE 1420 is equipped with two transmit antenna panels 1415 and 1425, which could also be two antenna element arrays connecting to two different TXRU chains. On antenna panel 1415, the UE can formulate four analog beams 1410, pointing to different directions or with different beam widths. On antenna panel 1425, the UE can formulate four analog beams 1435, pointing to different directions or with different beam widths. The analog beams formulated on the same antenna panel cannot be used simultaneously. However, the UE can simultaneously use any two beams formulated on two antenna panels.

In the example of FIG. 14, the UE would select one beam from 1410 and one beam from 1435 to transmit the uplink transmission. The UE can also only select one beam from 1410 or one beam from 1435 to transmit the uplink transmission. The selection of two beams, one beam from 1410 and one beam from 1435, can be called one Tx beam mode. In the example shown FIG. 14, there can be totally up to 16 Tx beam modes in UE 1420, with selecting beams from both 1410 and 1435. The UE 1420 can do the UL beam measurement over all these 16 Tx beam modes. A Tx beam mode can also include the selection of only one beam from all panels, in which case there are in total 16+8=24 Tx beam modes. The UE can choose one Tx beam mode to transmit the uplink transmission. In the example, the UE 1420 chooses Tx beam mode with analog beams 1405 and 1430 to transmit the uplink signals.

In a general example of UE with $N_{TX}$ antenna panels, one Tx beam mode of the UE can be implemented as the selection of one beam set:

$$\{B_{0,i_0}, B_{1,i_1}, \ldots, B_{N_{TX}-1, i_{N_{TX}-1}}\}$$

where $B_{j,i_j}$ is one beam selected from j-th antenna panel or antenna array.

In some embodiments, the UE is configured to report the configuration information its Tx beam modes to the network. The UE can report the configuration information of its Tx beam modes to the network through L1 signaling, MAC-CE and/or upper layer signaling (e.g., RRC message). The configuration information of one UE's Tx beam modes can include: the number of Tx beam modes that the UE supports; the ID of each Tx beam mode; and/or the spatial information of Tx beam modes. The configuration information may further include following.

In one example, the UE can implement to use different Tx beam modes to cover different arrival directions. This is useful to defeat the signal blockage around the UE. The information of different Tx beam modes covering different directions can be useful for the gNB, for example assisting the gNB to configure the UL RS for beam management. In one example, the gNB can indicate the UE to sweep the Tx beams pointing to different direction for UL beam measurement. In another example, such information can be the value of spatial correlation between two Tx beam modes. In one method, 1-bit information can be used as the indication of spatial correlation. For example, that 1-bit being 0 means two Tx beam modes pointing to different directions and that 1-bit being 1 means two Tx beam modes pointing to similar direction.

In yet another example, such information can be the grouping of Tx beam modes. The UE can indicate that those Tx beam modes are divided into one or more groups. In one method, the Tx beam modes from different group point to different direction but the Tx beam modes in the same group point to similar direction. In another method, the Tx beam modes in each group point to different direction.

In yet another example, such information can be implicit indicated through the ID of Tx beam modes. In one example, the ID of Tx beam modes is $\{1, 2, \ldots, N\}$. The information of spatial correlation between Tx beam modes is indicated by the differential of two Tx beam mode ID $|i-j|$, where i and j are the IDs of two Tx beam mode. Larger value of $|i-j|$ can indicate a lower spatial correlation between the arrival directions that two Tx beam modes point to. In yet another example, the priority of Tx beam modes is included. In yet another example, the UE can indicate the gNB that which Tx beam mode(s) the UE prefer to use. The Tx beam mode list can be descent (or ascent) priority list. In one method, the priority of Tx beam modes can be implicitly indicated through the ID of Tx beam modes. For example, smaller value of Tx beam mode ID implies higher (or lower) priority of that Tx beam mode.

In yet another example, such information can assist the gNB to configure NR-SRS for UL beam management and also indicate the Tx beam sweeping method on the NR-SRS transmission. In one example, the gNB can configure M NR-SRS resources to the UE and indicate the UE to utilize the M Tx beam modes with highest priority on those NR-SRS transmission.

In yet another example, such information can also assist the gNB to select the Tx beam mode for UE's uplink transmission. For example, the gNB measures good beam RSRP or CQI from NR-SRS signals that correspond to more than one Tx beam modes. Then the gNB can select the Tx beam mode with highest priority from those modes and indicate the UE to use that Tx beam mode for the uplink data transmission.

In some embodiments, the gNB can indicate one Tx beam mode to the UE and the UE is requested to apply the indicated Tx beam mode to the uplink transmission, e.g., NR-PUSCH and/or NR-PUCCH.

In one example, the gNB can indicate one Tx beam mode and the information of the uplink channel on which the UE is requested to use the indicated Tx beam. The indication can be signaled through RRC message, MAC-CE or DCI. The UE is configured to utilize the indicated Tx beam mode to transmit the uplink signal on indicated uplink channel until new indication is received. The indication can include the following information. In one instance, the indication includes the information of one Tx beam mode that the UE is requested to utilize on uplink transmission. In such instance, the information of one Tx beam mode can be indicated by following schemes: through the ID of one Tx beam mode explicitly; through the ID of one NR-SRS resource. The UE can be configured to use the Tx beam mode that is used to transmit the NR-SRS signal on the indicated NR-SRS resource; through the ID of slot which one NR-SRS resource is transmitted in. The UE can be configured to use the Tx beam mode that is used to transmit the NR-SRS in the indicated slot; and through one PMI index or a precoder index.

In one instance, the indication includes the slot offset information. The slot index when the UE may begin to utilize the indicated Tx beam for uplink transmission. In one instance, the indication includes the uplink channel on which the UE may utilize the indicated Tx beam. For example, the gNB can indicate the UE to utilize the indicated Tx beam for NR-PUSCH transmission. The gNB can indicate another Tx beam to the UE for NR-PUCCH transmission.

In one example, the gNB can indicate one Tx beam in the DCI that schedules a NR-PUSCH transmission and the UE is configured to use the indicated Tx beam mode to transmit the NR-PUSCH scheduled by the same DCI. In one scheme, the gNB can indicate one Tx beam in the DCI that triggers a NR-PUCCH transmission and the UE is configured to use the indicated Tx beam mode to transmit the NR-PUCCH triggered by the same DCI.

In some embodiments, the gNB can indicate one NR-SRS resource index (SRI) to a UE and the UE can be requested to apply the Tx beamformer or Tx precoder on the DMRS for uplink transmission so that the antenna port(s) of DMRS is QCLed of Tx spatial information to a NR-SRS resource previously transmitted identified by the indicated SRI. The information indicated to a UE can include one or more of the followings: one or more SRI(s); one or more physical channel identity. The UE can be requested to apply a Tx beamformoer or Tx precoder on the DMRS of indicated physical channel so that the antenna port(s) of the DMRS is QCLed to the indicated SRI. The physical channel can be NR-PUSCH, NR-PUCCH and/or NR-SRS; and a slot offset information to indicate the timing relationship between the indication signaling and UE's corresponding behavior. In one example, a piece of slot offset information can indicate the slot location when the UE can be configured to apply Tx beamformer so that the DMRS of corresponding physical channel is QCLed to the NR-SRS resource identified by the indicated SRI. The aforementioned indication information can be signaled via high-layer (RRC) signaling or MAC-CE or via L1 DL control signaling (using either UL-related or DL-related DCI).

Figure 15:
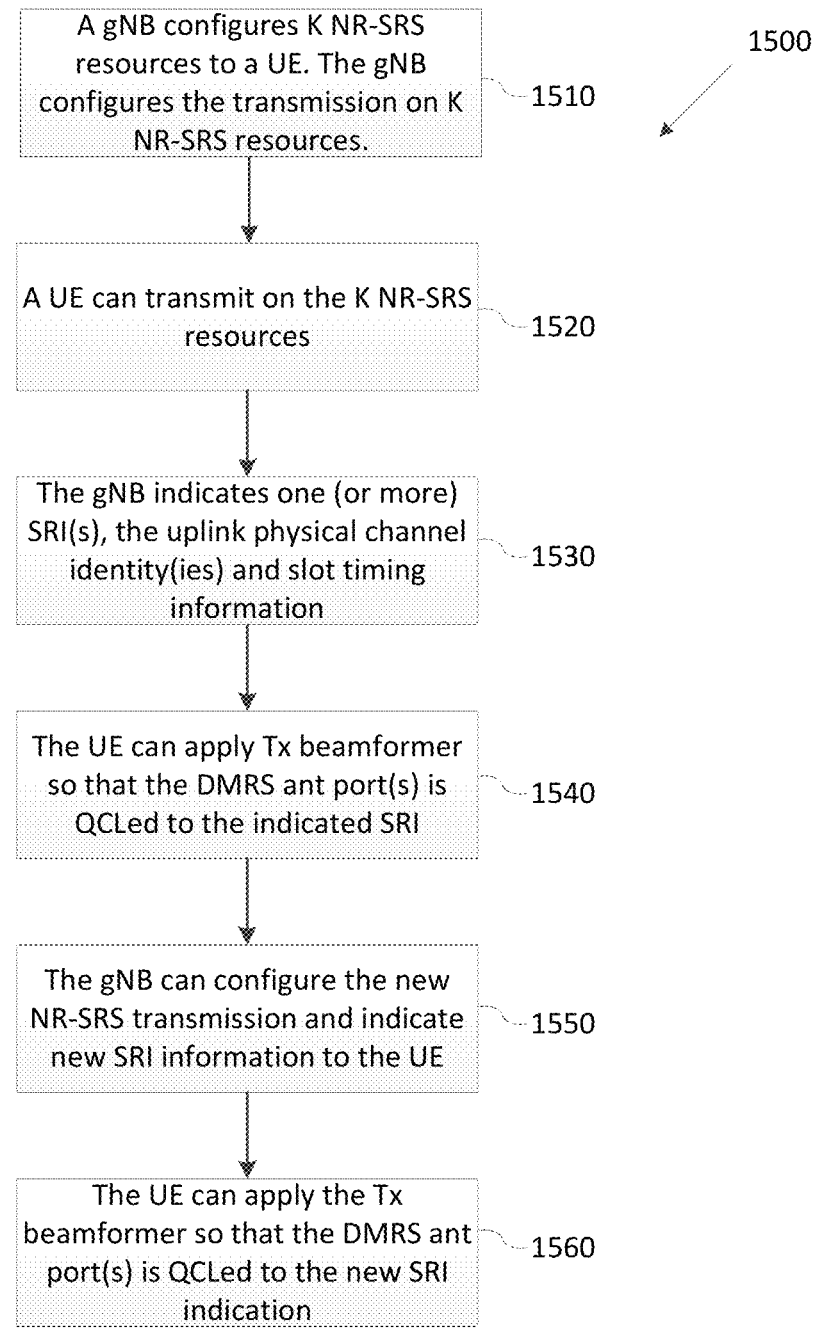
FIG. 15 illustrates a flow chart of a method for indicating SRI according to embodiments of the present disclosure.

FIG. 15 illustrates a flow chart of a method 1500 for indicating SRI according to embodiments of the present disclosure. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

An example of scheme for indicating SRI to a UE is illustrated in FIG. 15. Here a gNB first configures K NR-SRS resources to a UE, and the gNB can configure NR-SRS transmission on the K NR-SRS resources in 1510. While receiving the NR-SRS transmission configuration, the UE can transmit NR-SRS on the K configured NR-SRS resources as configured by the NW in 1520. After measuring the NR-SRS transmission on the K configured NR-SRS resources, the gNB can signal one SRI (or more) along with other information to the UE in 1530. Then in 1540, the UE can apply Tx beamformer(s) so that the DMRS of indicated physical channel is QCLed to the NR-SRS resource(s) identified by the indicated SRI in the indicated slot(s) or starting from the indicated slot. In 1550, the gNB can configure new NR-SRS transmission on those K NR-SRS resources or other set of NR-SRS resources, and then can indicate new SRI(s) to the UE. In 1560, while receiving the new SRI indication, the UE can apply a Tx beamformer so that the DMRS of indicated physical channel is QCLed to the NR-SRS resource(s) identified by the newly indicated SRI in the indicated slot(s) or starting from the indicated slot.

In one embodiment, the gNB can signal one SRI to a UE in slot no. The UE can be requested to apply a Tx beamformer(s) on the DMRS of NR-PUSCH and/or NR-PUCCH so that the antenna port(s) of the DMRS are QCLed to the NR-SRS resource identified by the indicated SRI in the latest NR-SRS transmission before the DCI transmitted from the gNB. The can be requested to do that starting from slot $n_0+1$, where 1 can be configured by the gNB via higher-layer signaling or MAC-CE or L1 signaling. The UE can be requested to do that so that the DMRS is QCLed to the NR-SRS resource identified by the indicated SIR until the UE receives new SIR indication from the NW.

In one embodiment, the gNB can signal one SRI in the DCI that schedules one NR-PUSCH transmission in slot n to a UE. The UE can be requested to apply Tx beamformer on the DMRS of the scheduled NR-PUSCH so that the antenna port(s) of the DMRS are QCLed to the NR-SRS resource identified by the indicated SRI in the latest NR-SRS transmission.

In one embodiment, the gNB can signal one SRI in the signaling that triggers or schedule a SPS UL transmission and the UE can be requested to apply Tx beamformer on the DMRS of the scheduled SPS transmission so that the antenna ports of DMRS in the SPS transmission are QCLed to the NR-SRS resource identified by the indicated SRI.

In one embodiment, the gNB can signal two SRIs (a first SRI and a second SRI) to a UE and configure the UE to apply Tx beamformer on DMRS of NR-PUSCH so that the antenna port(s) of DMRS of NR-PUSCH transmission is QCLed in spatial information to the NR-SRS resource identified by the a first SRI and the UE to apply Tx beamformer on DMRS of NR-PUCCH (or UL control channel) so that the antenna port(s) of DMRS of NR-PUCCH (or UL control channel) is QCLed in spatial information to the NR-SRS resource identified by a second SRI.

In one embodiment, the gNB can signal two SRIs (a first SRI and a second SRI) to a UE and also can signal pattern information on the association between NR-PUSCH transmission and the indicated SRIs. The UE can be requested to apply Tx beamformer so that the antenna port(s) of DMRS of NR-PUSCH in the future slots are QCLed to the NR-SRS resource identified by a first SRI or a second SRI by following the indicated pattern information on the association between NR-PUSCH and indicated SRIs. In one example, the gNB can signal the following to a UE. In one example, the gNB signals two SRIs: $SRI_1$ and $SRI_2$. In one example, the gNB signals a pattern information: one instance is one bitmap with L bits $[b_0, b_1, b_2, \ldots, b_{L-1}]$. Every bit in the bitmap corresponds to one slot with NR-PUSCH transmission from the UE. The value of one bit indicates which SRI the antenna port(s) of the DMRS in the corresponding NR-PUSCH transmission may be spatial information QCLed to. In one instance, $b_i=0$ indicates that the DMRS in the corresponding NR-PUSCH may be QCLed to a first SRI, SRI1 and $b_i=0$ indicates that the DMRS in the corresponding NR-PUSCH may be QCLed to a first SRI, $SRI_1$ and $b_i=1$ indicates that the DMRS in the corresponding NR-PUSCH may be QCLed to a second SRI, $SRI_2$.

When receiving the above configuration, the UE can be requested to apply Tx beamformer or precoder so that the DMRS in the corresponding NR-PUSCH is QCLed to the NR-SRS resource identified by the indicated SRI, a first SRI or a second SRI based on the configured bit map. The UE can be requested to do that until new configuration (new SRIs and/or new bitmap) is received.

Figure 16:
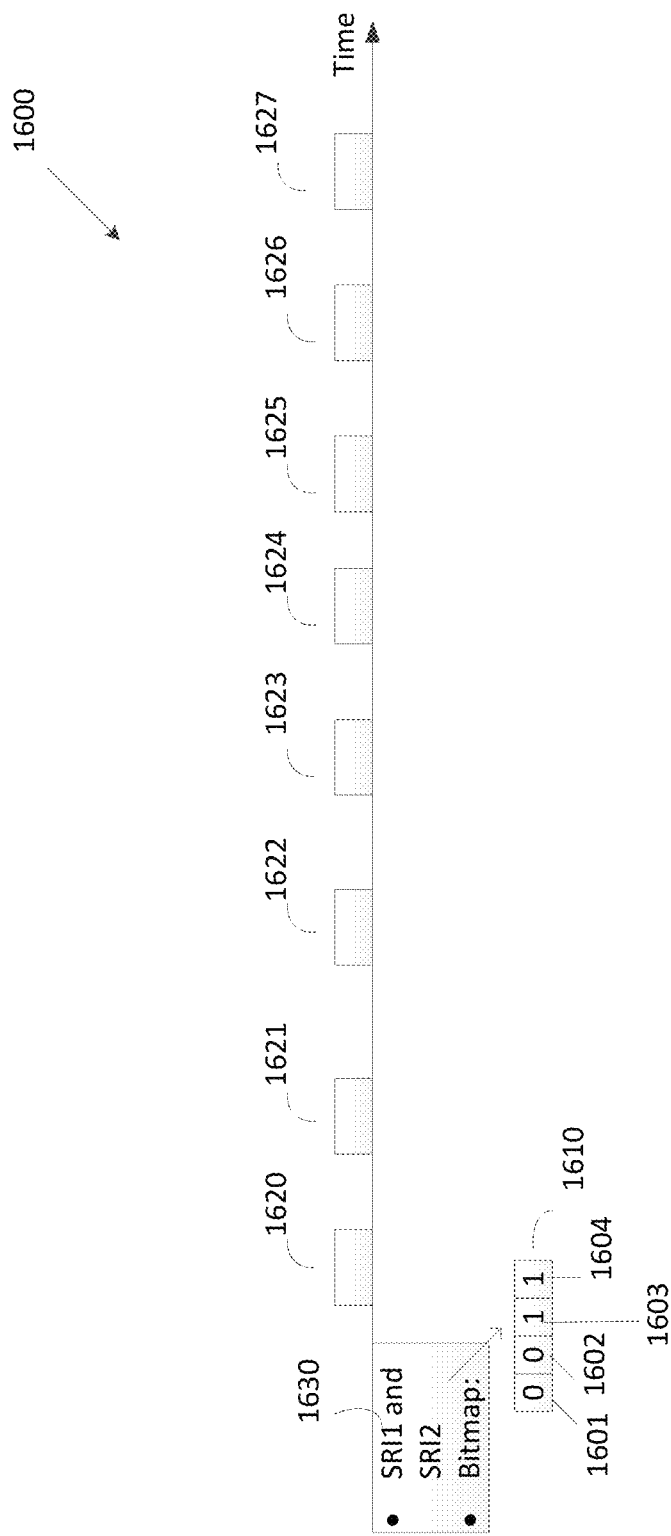
FIG. 16 illustrates an example indicating of two SRIs and a bitmap according to embodiments of the present disclosure.

FIG. 16 illustrates an example indicating of two SRIs and a bitmap 1600 according to embodiments of the present disclosure. An embodiment of the indicating of two SRIs and a bitmap 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

An example of indicating two SRIs and a bitmap is illustrated in FIG. 16. Here, a UE can be configured with two SRIs, $SRI_1$ and $SRI_2$, and a bitmap with 4 bits in 1630. The bitmap 1610 has four bits 1601, 1602, 1603 and 1604. Their values are 0, 0, 1, 1, respectively. Then in the uplink transmission, NR-PUSCH transmission from the UE in slot 1620 and 1624 correspond to bit 1601 in 1610; NR-PUSCH transmission from the UE in slot 1621 and 1625 correspond to bit 1602 in 1610; NR-PUSCH transmission from the UE in slot 1622 and 1626 correspond to bit 1602 in 1610; NR-PUSCH transmission from the UE in slot 1623 and 1627 correspond to bit 1603 in 1610. Based on the bit values in bitmap 1610, the UE is requested to transmit NR-PUSCH and DMRS so that the DMRS in NR-PUSCH in slot 1620, 1621, 1624, and 1625 are spatial information QCLed to the NR-SRS resource identified by $SRI_1$ and the UE is requested to transmit NR-PUSCH and DMRS so that the DMRS in NR-PUSCH in slot 1622, 1623, 1626, and 1627 are spatial information QCLed to the NR-SRS resource identified by $SRI_2$.

In one embodiment, the gNB can signal one SRI to a UE and the UE can be requested to apply Tx beamformers on the NR-SRS transmission on K configured NR-SRS resources so that NR-SRS transmission on the K NR-SRS resources are QCLed to the NR-SRS resource identified by the indicated SRI. The gNB can signal one piece of flag information to indicate the QCL mode to the UE. One example of the QCL mode can be that the NR-SRS transmission on those K NR-SRS resources are QCLed to each other and QCLed to the NR-SRS resource identified by the indicated SRI. One example of the QCL mode can be that the NR-SRS transmission on those K NR-SRS resources are NOT QCLed to each other but QCLed to the NR-SRS resource identified by the indicated SRI. This method will be useful for the NW to control the beam sweeping method on the NR-SRS transmission to support various beam determination purpose.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. § 112(f) unless the exact words "means for" are followed by a participle.

What is claimed is:
1. A user equipment (UE) for transmitting a sounding reference signal (SRS) in a wireless communication system, the UE comprising:
    a transceiver configured to receive, from a base station, SRS configuration information including a configuration on a SRS resource set, the SRS resource set including a plurality of SRS resources; and a processor operably connected to the transceiver, the processor configured to identify an SRS power based on pathloss information, a parameter $P_O$, and a parameter $\alpha$, wherein the transceiver is further configured to transmit, to the base station, SRSs corresponding to the SRS resource set based on the identified SRS power, wherein the parameter $P_O$ and the parameter $\alpha$ are configured for the SRS resource set by a higher layer signaling, and wherein the pathloss information for the SRS resource set is identified based on a synchronization signal (SS) block index or a channel state information reference signal (CSI-RS) which is configured by the base station.

2. The UE of claim 1, wherein:
the transceiver is further configured to transmit capability information to the base station,
the capability information includes a maximum number of SRS resources per SRS resource set and a maximum number of SRS resources sets.

3. The UE of claim 1, wherein, when the SRS resource set is configured for beam measurement, an SRS corresponding to an SRS resource among the plurality of SRS resources is transmitted in a transmission occasion.

4. The UE of claim 1, wherein:
transmission beam information corresponding to an SRS resource is configured by the base station, and
an SRS corresponding to the SRS resource is transmitted based on a transmission beam indicated by the transmission beam information.

5. The UE of claim 1, wherein:
the transceiver is further configured to:
receive at least one SRS resource indicator (SRI) included in downlink control information when an uplink transmission to which a transmission beam is applied is configured by the base station; and
transmit uplink data based on the at least one SRI, and
the SRI is associated with a latest SRS transmission.

6. A base station for receiving a sounding reference signal (SRS) in a wireless communication system, the base station comprising:
a processor configured to generate SRS configuration information including a configuration on a SRS resource set, the SRS resource set including a plurality of SRS resources; and
a transceiver operably connected to the processor, the transceiver configured to:
transmit, to a user equipment (UE), the SRS configuration information; and
receive, from the UE, SRSs corresponding to the SRS resource set transmitted based on an SRS power identified based on based on pathloss information, a parameter $P_O$, and a parameter $\alpha$,
wherein the parameter $P_O$ and the parameter $\alpha$ are configured for the SRS resource set by a higher layer signaling, and
wherein the pathloss information for the SRS resource set is indicated based on a synchronization signal (SS) block index or a channel state information reference signal (CSI-RS) which is configured by the base station.

7. The base station of claim 6, wherein:
the transceiver is further configured to receive capability information from the UE,
the capability information includes a maximum number of SRS resources per SRS resource set and a maximum number of SRS resources sets.

8. The base station of claim 6, wherein, when the SRS resource set is configured for beam measurement, an SRS corresponding to an SRS resource among the plurality of SRS resources is transmitted in a transmission occasion.

9. The base station of claim 6, wherein:
transmission beam information corresponding to an SRS resource is configured by the base station, and
an SRS corresponding to the SRS resource is transmitted based on a transmission beam indicated by the transmission beam information.

10. The base station of claim 6, wherein:
the transceiver is further configured to:
transmit at least one SRS resource indicator (SRI) included in downlink control information when an uplink transmission to which a transmission beam is applied is configured by the base station; and
receive uplink data based on the at least one SRI, and
the SRI is associated with a latest SRS transmission.

11. A method of transmitting a sounding reference signal (SRS) in a wireless communication system, the method comprising:
receiving, from a base station, SRS configuration information including a configuration on a SRS resource set, the SRS resource set including a plurality of SRS resources;
identifying an SRS power based on pathloss information, a parameter $P_O$, and a parameter $\alpha$; and
transmitting, to the base station, SRSs corresponding to the SRS resource set based on the identified SRS power,
wherein the parameter $P_O$ and the parameter $\alpha$ are configured for the SRS resource set by a higher layer signaling, and
wherein the pathloss information for the SRS resource set is identified based on a synchronization signal (SS) block index or a channel state information reference signal (CSI-RS) which is configured by the base station.

12. The method of claim 11, further comprising:
transmitting capability information to the base station,
wherein the capability information includes a maximum number of SRS resources per SRS resource set and a maximum number of SRS resources sets.

13. The method of claim 11, wherein, when the SRS resource set is configured for beam measurement, an SRS corresponding to an SRS resource among the plurality of SRS resources is transmitted in a transmission occasion.

14. The method of claim 11, wherein:
transmission beam information corresponding to an SRS resource is configured by the base station, and
an SRS corresponding to the SRS resource is transmitted based on a transmission beam indicated by the transmission beam information.

15. The method of claim 11, further comprising:
receiving at least one SRS resource indicator (SRI) included in downlink control information when an uplink transmission to which a transmission beam is applied is configured by the base station; and
transmitting uplink data based on the at least one SRI,
wherein the SRI is associated with a latest SRS transmission.

16. A method for receiving a sounding reference signal (SRS) by a base station in a wireless communication system, the method comprising:

generating SRS configuration information including a configuration on a SRS resource set, the SRS resource set including a plurality of SRS resources;

transmitting, to a user equipment (UE), the SRS configuration information; and receiving, from the UE, SRSs corresponding to the SRS resource set transmitted based on an SRS power identified based on based on pathloss information, a parameter $P_O$, and a parameter $\alpha$, wherein the parameter $P_O$ and the parameter $\alpha$ are configured for the SRS resource set by a higher layer signaling, and wherein the pathloss information for the SRS resource set is indicated based on a synchronization signal (SS) block index or a channel state information reference signal (CSI-RS) which is configured by the base station.

17. The method of claim 16, further comprising:
receiving capability information from the UE,
wherein the capability information includes a maximum number of SRS resources per SRS resource set and a maximum number of SRS resources sets.

18. The method of claim 16, wherein, when the SRS resource set is configured for beam measurement, an SRS corresponding to an SRS resource among the plurality of SRS resources is transmitted in a transmission occasion.

19. The method of claim 16, wherein:

transmission beam information corresponding to an SRS resource is configured by the base station, and an SRS corresponding to the SRS resource is transmitted based on a transmission beam indicated by the transmission beam information.

20. The method of claim 16, further comprising:

transmitting at least one SRS resource indicator (SRI) included in downlink control information when an uplink transmission to which a transmission beam is applied is configured by the base station; and receiving uplink data based on the at least one SRI, wherein the SRI is associated with a latest SRS transmission.

* * * * *